United States Patent
Mickey et al.

(10) Patent No.: US 8,488,306 B2
(45) Date of Patent: Jul. 16, 2013

(54) SECONDARY COMPUTING DEVICE DISPLAY SYSTEM

(75) Inventors: Benjamin L. Mickey, Gilbert, AZ (US);
David C. Ramsperger, Gilbert, AZ (US); Brad Fulghum, Queen Creek, AZ (US); Miguel Chapa, Gilbert, AZ (US)

(73) Assignee: Sideline, Inc., Wilmington, DE (US)

( * ) Notice: Subject to any disclaimer, the term of this patent is extended or adjusted under 35 U.S.C. 154(b) by 323 days.

(21) Appl. No.: 12/938,183

(22) Filed: Nov. 2, 2010

(65) Prior Publication Data

US 2011/0043990 A1    Feb. 24, 2011

Related U.S. Application Data

(63) Continuation-in-part of application No. 12/267,383, filed on Nov. 7, 2008, now Pat. No. 7,889,481.

(60) Provisional application No. 60/986,567, filed on Nov. 8, 2007.

(51) Int. Cl.
*H05K 5/00* (2006.01)
*H05K 7/00* (2006.01)
*E04G 3/00* (2006.01)

(52) U.S. Cl.
USPC ............ 361/679.04; 361/679.06; 361/679.07; 361/679.27; 248/278.1; 248/279.1

(58) Field of Classification Search
USPC ............ 361/679.01–679.07, 679.21–679.29, 361/679.41–679.45; 312/223.1, 223.2; 248/278.1, 279.1
See application file for complete search history.

(56) References Cited

U.S. PATENT DOCUMENTS

| | | | |
|---|---|---|---|
| 6,343,006 B1 * | 1/2002 | Moscovitch et al. | 361/679.04 |
| 6,532,146 B1 * | 3/2003 | Duquette | 361/679.04 |
| 6,967,632 B1 * | 11/2005 | Minami et al. | 345/1.3 |
| 7,889,481 B2 | 2/2011 | Mickey et al. | |
| 2006/0245153 A1 * | 11/2006 | Tsai et al. | 361/681 |

OTHER PUBLICATIONS

Notice of Allowance and Fee(s) Due dated Oct. 4, 2010, U.S. Appl. No. 12/267,383, 5 pages.

* cited by examiner

*Primary Examiner* — Zachary M Pape
*Assistant Examiner* — Jerry Wu
(74) *Attorney, Agent, or Firm* — Dorsey & Whitney LLP

(57) ABSTRACT

A secondary computing device display system includes a removable attachment mechanism operable to removably attach a secondary computing device display to a primary computing device display. The removable attachment mechanism comprises a first attachment member, operable to slideably attach to the secondary computing device display, and a second attachment member, comprising a clamping trench and a clamp locking lever. The second attachment member is operable to removably clamp the primary computing device display by inserting a clamping ridge of the primary computing device display in the clamping trench and engaging a notched surface of the clamping ridge with the clamp locking lever. The first and second attachment member are frictionally rotatable with respect to each other along a first axis and a second axis.

19 Claims, 21 Drawing Sheets

SECONDARY COMPUTING DEVICE DISPLAY SYSTEM

RELATED APPLICATIONS

This application claims priority under 35 U.S.C. §120 to U.S. Patent Publication No. 2009/0122474, filed Nov. 7, 2008, which is herein incorporated by reference in its entirety.

FIELD OF THE INVENTION

This invention relates generally to computing devices, and more specifically to computing device display systems.

BACKGROUND

Users may desire to utilize more than one display concurrently with their computing devices. Computing devices may include, but are not limited to, personal computers, workstations, laptop computers, personal digital assistants, telephones, computer appliances, MP3 players, or other electronic devices that perform computing functions. Users desiring to utilize more than one display concurrently typically have to purchase one or more external displays and then connect these external displays to the selected computing device, generally to a video card installed in the computing device. Users may utilize multiple screens when supported by an operating system of the computing device, including but not limited to Windows®, so that when opening more than one "window" the user is able to view each window on a separate screen.

Generally, however, the use of multiple screens is expensive and bulky. In most cases, the primary and secondary screens are large and unwieldy, making them difficult to transport or set up while a user is traveling. Most have dedicated, attached bases and are adjustable only over a limited range of heights. Accordingly, there is a need in the art for an improved secondary computing screen and/or an improved system for setting up a secondary computing screen.

SUMMARY

A secondary computing device display system may enable one or more secondary computing device displays to be removably attached to at least one primary computing device display. The secondary computing device display system may include at least one secondary computing device display; at least one primary computing device display; and at least one removable attachment mechanism structured and arranged to removably attach the at least one secondary computing device display to the at least one operable primary computing device display.

In some implementations, the removable attachment mechanism may include a first attachment member, operable to slideably attach to the at least one secondary computing device display, and a second attachment member. The second attachment member may include a clamping trench, including first and second clamping lips that define an aperture that is narrower than the clamping trench, and a clamp locking lever. The second attachment may be operable to removably clamp to a primary computing device display by inserting a clamping ridge of the primary computing device display into the clamping trench and utilizing the clamp locking lever to engage a notched surface of the clamping ridge. The first attachment member may be frictionally rotatably coupled to the second attachment member such that the first attachment member is frictionally rotatable with respect to the second attachment member along a first axis and a second axis. The second attachment member may be frictionally rotatably coupled to the first attachment member such that the second attachment member is frictionally rotatable with respect to the first attachment member along a first axis and a second axis.

The at least one computing device image display may include at least one computing device image display input receiver which may include at least one universal-serial-bus-enabled connector. The at least one universal-serial-bus-enabled connector may include at least two universal-serial-bus-enabled connectors wherein at least one universal-serial-bus-enabled connector transmits video data and at least one universal-serial-bus-enabled connector transmits power. The at least one universal-serial-bus-enabled connector may include at least one video data converter. The at least one operable secondary computing device display may have a smaller perimeter than the at least one primary computing device display.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION OF THE EMBODIMENTS

The description that follows includes exemplary systems, methods, and/or apparatuses that embody techniques of the present disclosure. However, it should be understood that the described disclosure may be practiced without these specific details. Reference will now be made in detail to the subject matter disclosed, which is illustrated in the accompanying drawings.

A system may provide one or more secondary displays for use with a computing system having a primary computing device display. In utilizing the system, a user may select from a set of pre-sized displays taking the form of one or more secondary displays that may be user-attached (e.g., removably attached), or user-removed, from a primary computing device display and connected to a selected computing device. Certain of the one or more secondary displays may be smaller than the primary computing device display and may be sized specifically, as selected by a user from a set of different-sized displays, for a user selected purpose. The one or more secondary displays may be selectively sized to have about equally dimensioned adjacent sides to the primary computing device display and smaller perimeter sizing than the primary computing device display, or may have differing dimensioned adjacent sides to the primary computing device display and the same or larger perimeter sizing that the primary computing device display. The one or more secondary displays may be removably attached without the need for a separately installed video card.

Figure 1:
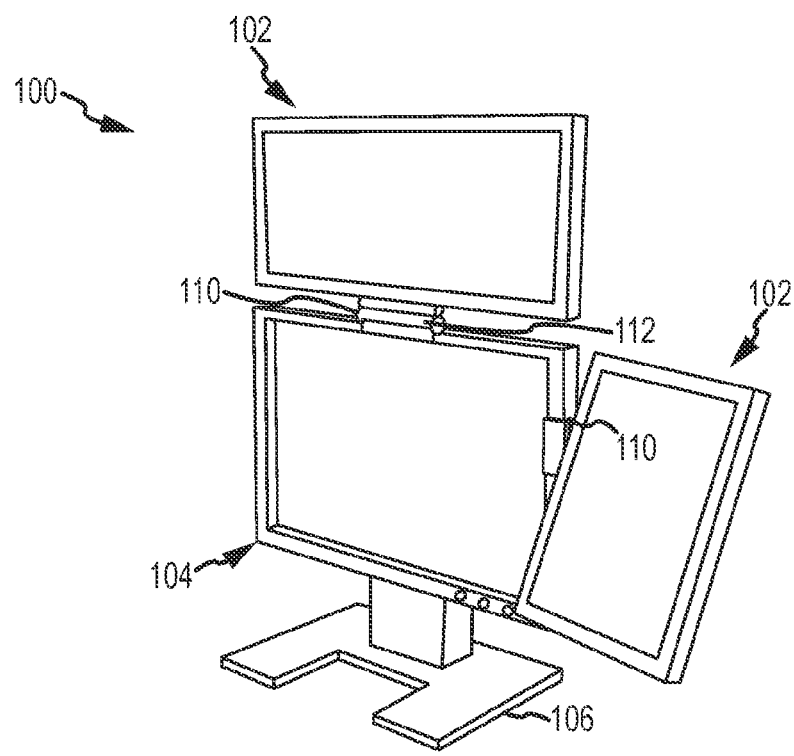
FIG. 1 shows a perspective view, illustrating desktop secondary computing device displays of the secondary computing device display system, according to an embodiment of the present disclosure.

FIG. 1 shows a perspective view, illustrating multiple secondary computing device displays 102 of the secondary computing device display system 100, according to an embodiment of the present disclosure.

The secondary computing device display system 100 may constitute one or more secondary computing device displays 102, attachable to at least one primary computing device displays 104. Both the primary and secondary displays may be controlled by, or receive data from, at least one computing device in order to display images (whether generated by computer, camera, PDA, and so on). Sample secondary displays may include, but are not limited to, touch screens; digital electronic displays; plasma screens; liquid crystal displays; high-performance addressing displays; thin film transistor displays; light-emitting diode displays; organic light-emitting diode displays; laser displays; surface conduction electron-emitter displays; nanocrystal displays; carbon nanotubes, and so on.

The secondary computing device displays 102 may be removably attached to the primary computing device display 104 by a clamping assembly 100, which may include a swivel mechanism 112 (best viewed in FIG. 6), that assists a user in placing the secondary computing device displays 102 in a user-preferred viewing position, as shown. In alternative embodiments other removable attachment mechanisms such as, for example, friction-fit clamps, brackets, living hinges, mechanical fasteners, etc., may be utilized instead of, or in addition to, those described herein.

FIG. 1 further illustrates a primary computing device display 104 that includes a desktop base support 106 which supports the primary computing device display 104 and assists in supporting the secondary computing device displays 102, as shown.

Figure 2:
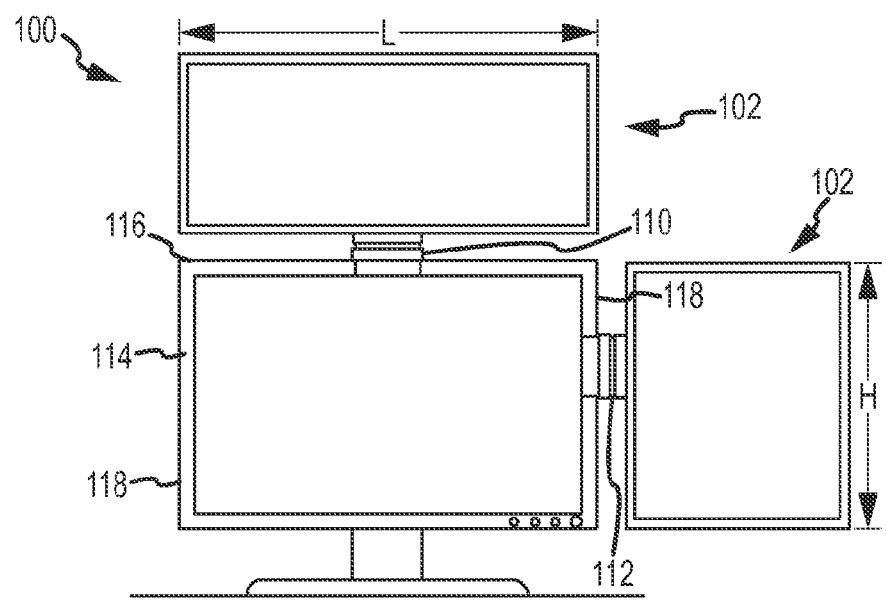
FIG. 2 shows a front elevational view, illustrating the desktop secondary computing device displays according to the embodiment of FIG. 1.

FIG. 2 shows a front elevational view of the system 100 of FIG. 1, illustrating the desktop secondary computing device displays 102 according to the embodiment of FIG. 1.

The secondary computing device displays 102 may be attached to any portion of the primary screen perimeter 114, such as the top perimeter 116 and/or the side perimeter 118, as shown. The secondary computing device displays 102 may be attached adjacent and parallel to the respective top perimeter 116 and/or side perimeter 118 of the primary computing device display 104, as shown. The secondary computing device displays 102 may be manufactured in a size to closely match at least one top perimeter length "L" and/or side perimeter height "H" of the primary computing device display 104, as shown, or may be manufactured in a size larger or smaller than the at least one top perimeter length "L" and/or side perimeter height "H" of the primary computing device display 104. Further, the total perimeter of the secondary computing device display 102 may be smaller than the total perimeter of the primary computing device display 104, also as shown. In alternative embodiments other combinations of secondary screen dimensions such as screens smaller than the primary screen, etc., may be utilized. Secondary displays may be manufactured by multiple manufacturers that will, upon negotiation, manufacture such screens. Examples of such manufacturers may include, but are mot limited to, TMDisplay™, SVA-NEC™, Sharp™, Samsung™, QDI Quanta Display™, LPL LG Phillips™, Innolux™, InfoVision™, HSD Hannstar Display™, CPT Chunghwa Picture Tubes™, CMO Chi Mei Optoelectronics™, BOE Technology Group™, AU Optronics™, Wintek™, and so on.

Figure 3:
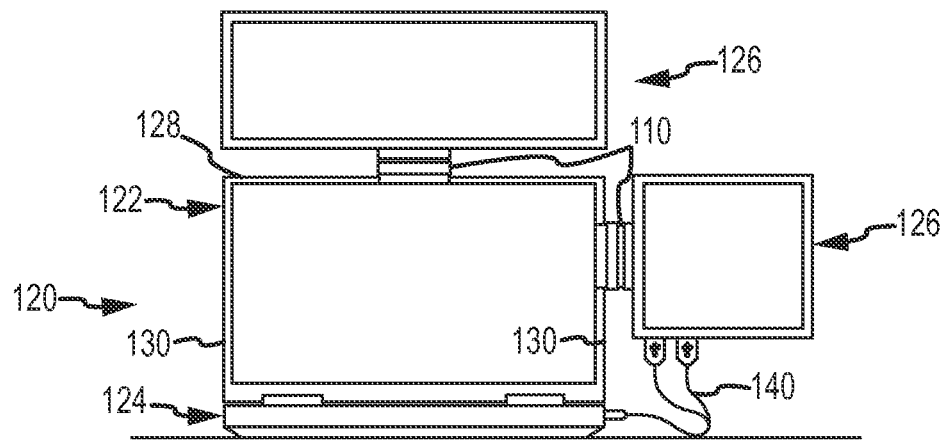
FIG. 3 shows a front elevational view, illustrating a laptop secondary display and computing device coupling arrangement, according to a first alternative embodiment.

FIG. 3 shows a front elevational view, illustrating a laptop secondary display 122 and computing device coupling assembly 140 of a secondary computing device display system 120, according to a first alternative embodiment.

The system 120 may include at least one secondary computing device display 126, as shown. The system 120 may have secondary computing device displays 126 that are mountable to a primary computing device display 122, such as the built-in screen of a portable or laptop computing device 124, as shown. As in embodiment 101, in system 120 the secondary computing device displays 126 may be removably attached to the primary computing device display 122, as shown and in the same fashion generally described with respect to FIGS. 1 and 2.

Figure 4:
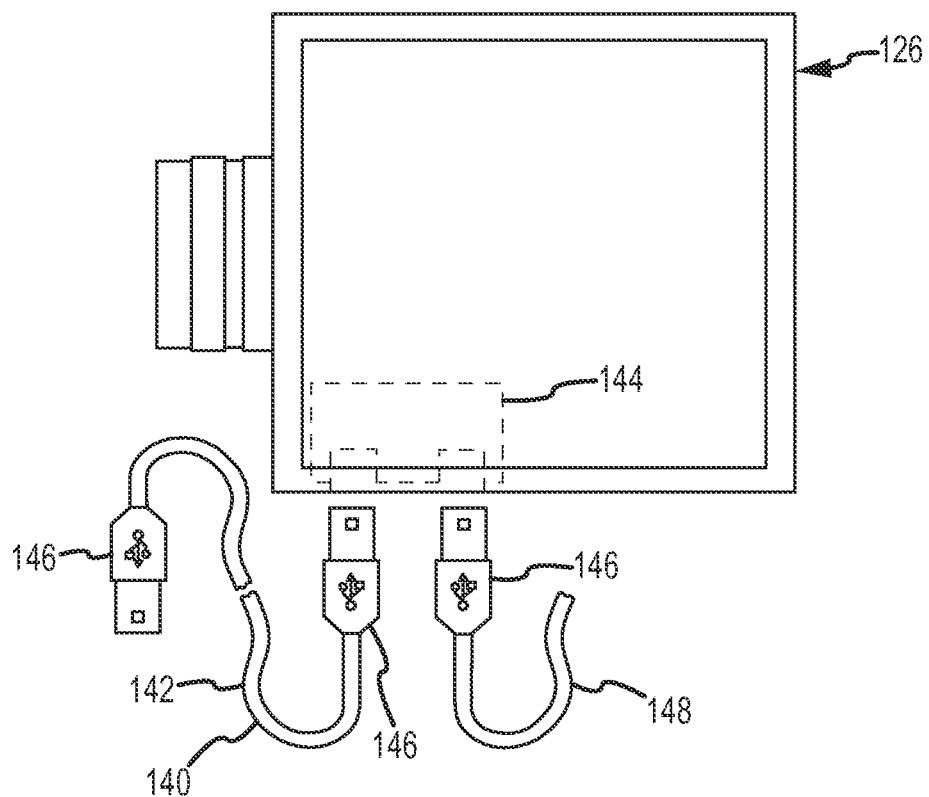
FIG. 4 shows a front elevational view, illustrating a secondary computing device display and a computing device coupling assembly, according to an embodiment of the present disclosure.

FIG. 4 shows a front elevational view of a secondary computing device display 126 and a computing device coupling assembly 140, according to an embodiment of the present disclosure. In both the embodiment of FIG. 1 and the embodiment of FIG. 3, the respective secondary computing device displays (126 shown as representations) may be attached to a primary computing device image display output (i.e. computer, camera, PDA, etc.) utilizing at least one computing device coupling assembly 140 (shown with two computing device coupling assemblies 140 to laptop computing device 124). The computing device coupling assembly 140 may assist video data transmission and/or power transmission through a USB (universal serial bus) protocol (such as USB 1.0, USB 2.0, and/or USB 3.0), FireWire protocol, serial data transmission protocol, parallel data transmission protocol and so forth.

Each secondary computing device display 126 may include a computing device image display means (which may be coupled to at least one USB enabled connector) for displaying at least one inputted image. The computing device image display means may include at least one video data converter 144. The at least one video data converter 144 may be located inside the housing of the secondary computing device display 126. Sample video data converters 144 may include video processing components commercially distributed by suppliers and/or manufactures of video over standardized interfaces (including, but not limited to, USB). Examples of such video processing components may include, but are not limited to, components commercially distributed under the DisplayLink™ trademark and provided by DisplayLink Corp. of Palo Alto, Calif. Such components commercially distributed under the DisplayLink™ trademark may include, but are not limited to, the DL-120 and/or DL-160 DisplayLink™ chip lines.

Certain embodiments may facilitate the sending of real-time interactive computing images from a computing device, to a secondary display 126, across nearly any standardized interface including (but not limited to) USB, FireWire, WiMedia, and Ethernet. A standard USB connector cable 142, with a coupler 146, may be utilized to input computing image display data from a computing device to the display 126. In alternative embodiments other connectors such as VGA, HDMI, DVI, SCART, etc., may be utilized, including proprietary connectors and cables capable of carrying multiple power and/or data signals simultaneously.

Power for the secondary computing device display 126 may be transmitted through the USB dedicated power cable 148. Individual USB connector cables may be utilized for power and for data, as shown. However, alternate embodiments may utilize a single USB cable for both power and data transmission. In alternative embodiments, other power supply arrangements, such as a separate power source for the secondary computing device displays 126 including, but not limited to, typical AC/DC (alternating current/direct current) power converters that plug into a standard electrical wall outlet, etc., may be utilized. A computing device operating system may recognize the USB-connected device through a reporting feature of the computing device's operating system (such as the "found new hardware" feature of certain WINDOWS operating systems). In a sample embodiment, data drivers and instructions to enable utilization of the secondary computing device display system may be provided. In alternative embodiments, other operating systems and system driver locators including, but not limited to, the Internet, freeware, etc., may be utilized.

FIGS. 5-10F generally depicts various attachment mechanisms, or portions thereof, for connecting a secondary display to a primary display of a computing system. Each will be discussed in turn.

Figure 5:
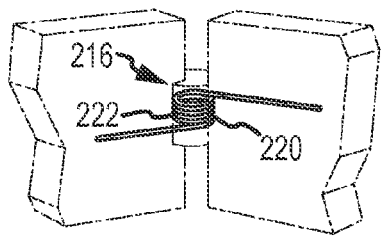
FIG. 5 shows a side perspective view, schematically illustrating a joint of the clamp of the secondary computing device display system according to the embodiment of FIG. 6.
Figure 6:
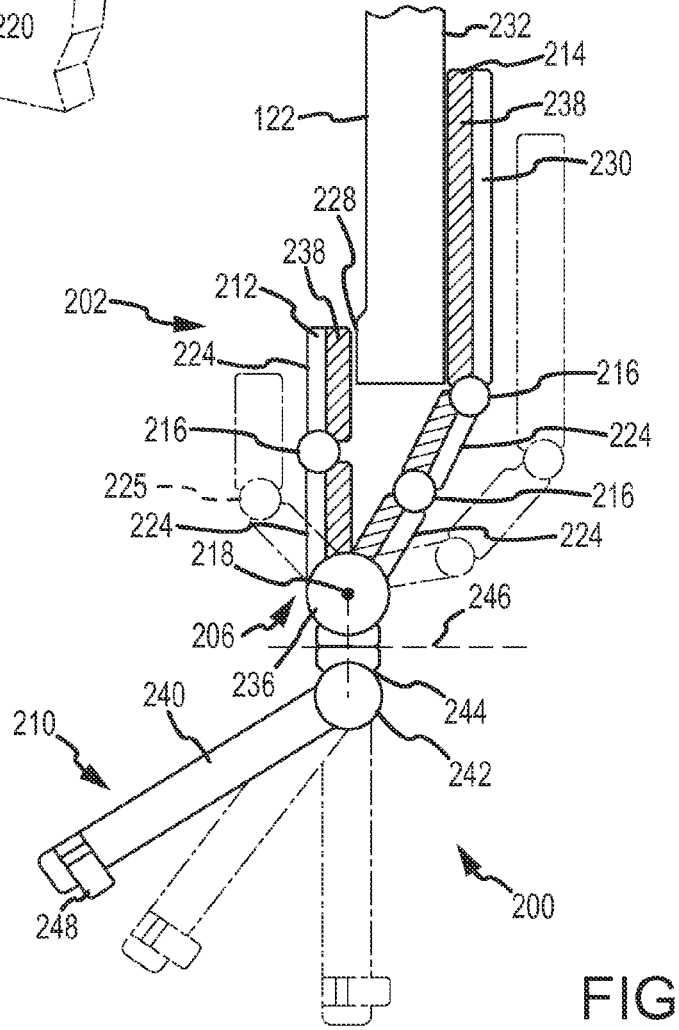
FIG. 6 shows a side elevational view, illustrating a clamp of the secondary computing device display system, according to an embodiment of the present disclosure.

FIG. 5 shows a side perspective view of a joint 216 of a clamp 200 of the secondary computing device display system 100 according to the embodiment 202 of FIG. 6. FIG. 6 shows a side elevational view, illustrating the clamp 200 of the secondary computing device display system, according to an embodiment 202 of the present disclosure.

Clamp 200 may include a removable attachment mechanism for removably attaching a computing device image display to the primary computing device display. The clamp 200 may constitute a dual-finger clamp 206 and an arm 210, as shown.

In alternative embodiments, other clamp arrangements such as the use of a dual arm, dual finger, multi-arm configuration, more or less segments, etc., may be utilized.

The dual-finger clamp 206 may constitute a front finger clamp portion 212 and a rear finger clamp portion 214, as shown. The front finger clamp portion 212 may have a front joint 216, separating the front finger clamp portion into upper and lower segments, and permitting these segments to move about the joint. Joint 216 may constitute a flexing mechanism 220 (illustrated in FIG. 5) utilizing the loading of a compression spring 222 (illustrated in FIG. 5) in the longitudinal direction of the articulated portions 224 so that each respective articulated portion 224 adjacent the joint 216 may be spring tensioned in a desired direction. As one example, the front joint 216 may permit the articulated segments 224 to be biased toward the rear finger clamp portions 214, as shown. The spring may be covered with an aesthetic enclosure 225, as shown. In alternative embodiments, other joint arrangements such as more than one joint, etc., may be utilized.

Front finger clamp portion 212 may include two approximately equal sized articulated portions 224 sized such that the face 226 of the top articulated portion 224 clamps to only a perimeter portion 228 of a primary computing device display 122, as shown. Articulated portions 224 may be about one-half-inch to about one-inch in height. In alternative embodiments, other dimensions utilizing materials including, but not limited to, plastics, hardwoods, ceramics, etc., may be utilized.

Rear finger clamp portion 214 may constitute two articulating portions 280, one articulating portion 230, and two joints 286, as shown. As taught above with respect to joint 216, each respective joint 286 may include a flexing mechanism that utilizing the loading of a compression spring in the longitudinal direction of the articulated portions 280 so that each respective articulated portion 280 adjacent to the joint 286 is spring tensioned in a specific direction, such as toward the front finger clamp portion 214, as shown.

Rear finger support 230 may be sized to firmly abut against the rear portion 232 of the primary computing device display 122 when the dual-finger clamp 206 engages the primary computing device display 122. In one sample embodiment, the rear support 230 may be about two to four inches in height, as shown. The increased rear height (as compared to the upper body 224 of the front finger 212) may provide a more stable support structure for the attached secondary computing device display. Generally, in operation, the rear support 230 and front finger upper body 224 sandwich a portion of the secondary display 122 and are biased toward one another by a spring-tensioned joint 236 (which may constitute a flexing mechanism utilizing the loading of a compression spring such that rear finger clamp portion 214 and from finger clamp portion 212 are sprint tensioned in a specific direction, such as towards each other, as shown). The multiple joints 286 and multiple articulating portions 280 and rear finger support 230 in the rear finger clamp portion 214 may act in combination to allow the rear finger clamp portion 214 to adjust in order to contact the primary computing device display 122 at as many points as possible so as to support or clamp to a variety of primary computing device displays having different thicknesses.

This spring tensioned joint 236, to which both the front finger clamp portion 212 and a rear finger clamp portion 214 are hingedly attached, permits the front finger clamp portion 212 and rear finger clamp portion 214 to swing towards each other as they are spring tensioned together and may share the same hinge center axis, as shown. Thus, the removable attachment mechanism is based on the biasing of the springs in joints 216, 286, and 236 to clamp to a primary computing device display. This arrangement may facilitate the front and rear fingers adjusting to support or clamp to a variety of primary computing device displays having different thicknesses, insofar as the respective articulated portions 224 and 280 and articulated portion 230 frictionally engage the primary computing device display 122, as shown. In alternative embodiments, other friction clamping arrangements including, but not limited to, plastic teeth, rubber ridges, carbon-fiber grooves, etc., may be utilized.

To further assist frictional engagement between the clamp 200 and primary computing device screen 122 and to reduce the likelihood of the primary computing device screen being damaged by operation of the clamp 200, each respective articulating portion 230 may include a pad 238, such as a rubber pad or a silicone rubber pad (which may have a Shore hardness of between about 30 and 60 and/or about 40 and 50). In alternative embodiments, other friction materials and methods utilizing materials including, but not limited to, plastics, other rubbers, fabric, etc., may be utilized.

The arm 210 may constitute a single support 240, which may be hingedly attached to a movable joint 242, as shown. Joint 242 may be a stiffened joint so as to allow swivel movement under pressure by a user, but not to swing freely. Single-arm second clamp portion 210 may support and attach to a secondary computing device display (for example, secondary computing device display 102, as described above). Single arm 240 may include an attaching element 248, such as a "male" attaching element that attaches to the secondary computing device display 126 (or 102, for example) by connecting to a matching "female" portion, which may include a channel to allow for some height adjustment, located behind the respective secondary computing device display. In alternative embodiments, other methods to attach the single arm to the secondary computing device including, but not limited to, mechanical connections, releasable connection, snap and lock connections, etc., may be utilized.

The embodiment may include a swivel joint 244 situated between joint 236 and joint 242, rotatable along axis 246, and situated transverse to joint 236 and joint 242, as shown. The swivel joint 244 may be rotated along an axis 246 such that joint 236 rotates about a central axis 218 parallel to joint 242 and perpendicular to axis 246 and/or that joint 242 rotates about a central axis 218 parallel to joint 236 and perpendicular to axis 246. In alternative embodiments, other arrangements and other angles of connections between the joints may be utilized.

Figure 7:
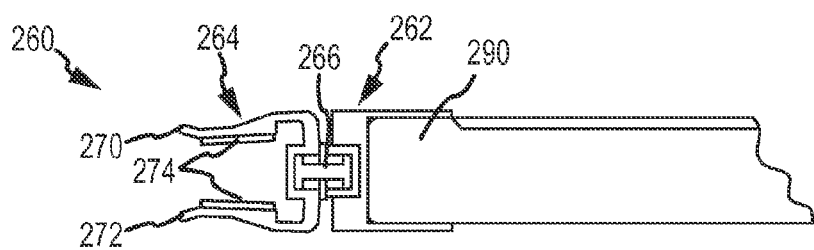
FIG. 7 shows a side elevational view, illustrating a second clamp of the secondary computing device display system, according to a second alternative embodiment of the present disclosure.

FIG. 7 shows a side elevational view of another sample clamp 260 of the secondary computing device display system 100, according to an alternative embodiment of the present disclosure. Clamp 260 may include an upper clamp portion 262 and a lower clamp portion 264, as shown. Upper clamp portion 262 may be connected to lower clamp portion 264 with a center-mounted pivot joint 266, such that upper clamp portion 262 can swivel with respect to lower clamp portion 264. Such motion permits single-axes rotation of a secondary display with respect to a primary display, an example of which is shown in FIG. 1. Returning to FIG. 7, a secondary computing device display 290 may be placed into upper clamp portion 262 and then attached to a primary display 114 that nests in lower clamp portion 264 (not shown). Lower clamp portion 264 may be a U-shaped plastic extrusion and may include flexible side portions 270 and 272. The flexible side portions 270 and 272 may fit a range of primary computing device screens. That is, because the flexible side portions 270 and 272 are flexible, a variety of primary computing device display may fit into the lower clamp portion 264 and be frictionally held by the flexible side portions 270 and 272. Clamp 260 may be utilized with relatively low weight secondary displays and/or when a low profile clamp may be more user-preferable.

Each respective flexible side portion 270 and 272 may include a friction pad 274. Friction pads 274 may be formed as a rubber friction pad, made from a material such as silicone rubber. In one example, the pads may have a Shore hardness of between about 30 and 60 and/or between about 40 and about 50. The friction pads 274 enhance the friction between the clamp 264 and primary display, thereby reducing the likelihood of the clamp to detach from the display, either fully or partially. In alternative embodiments, other friction materials and methods including, but not limited to, plastics, other rubbers, fabrics, gripping products, etc., may be utilized.

Figure 8:
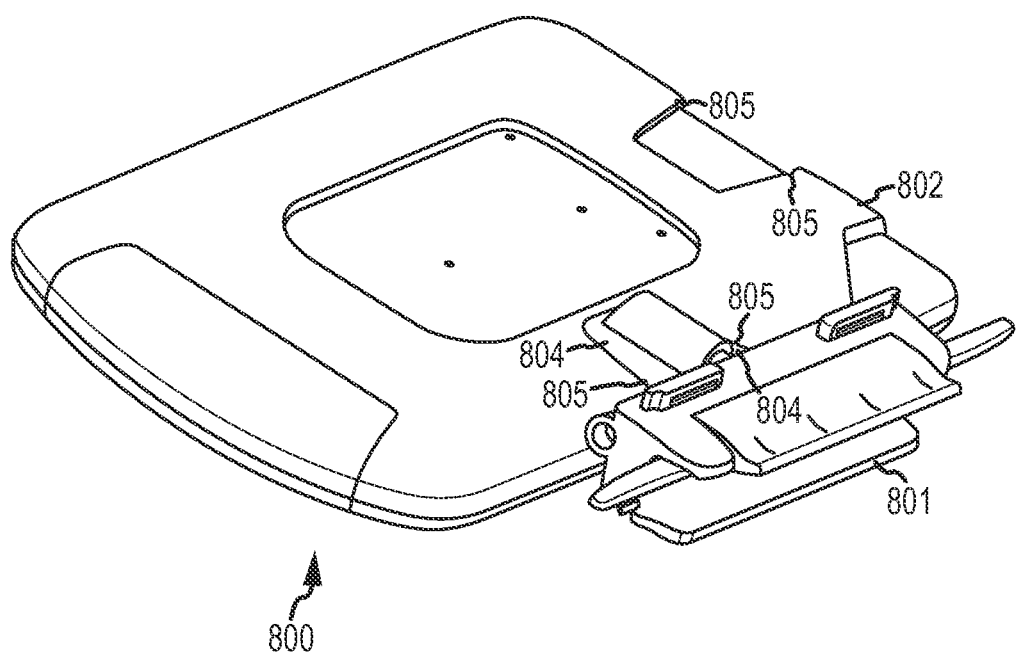
FIG. 8 shows a top isometric view, illustrating a removable attachment mechanism of the secondary computing device display system, according to a third alternative embodiment of the present disclosure.

FIG. 8 shows a top isometric view of a removable attachment mechanism 801 of the secondary computing device display system, according to a third alternative embodiment of the present disclosure. A first attachment member 804 of the removable attachment mechanism 801 may lockably attach to at least one groove 805 formed on a surface of the secondary computing device display 802. The first attachment member 804 may lockably attach to the at least one groove 805 by engaging one or more detents (best viewed in FIG. 10A as detents 1009) with one or more notches in the groove 805. It should be noted that a single secondary display 802 may include multiple attachment grooves 805. For example, attachment grooves may be located on different sides or surfaces of the secondary display.

Figure 9:
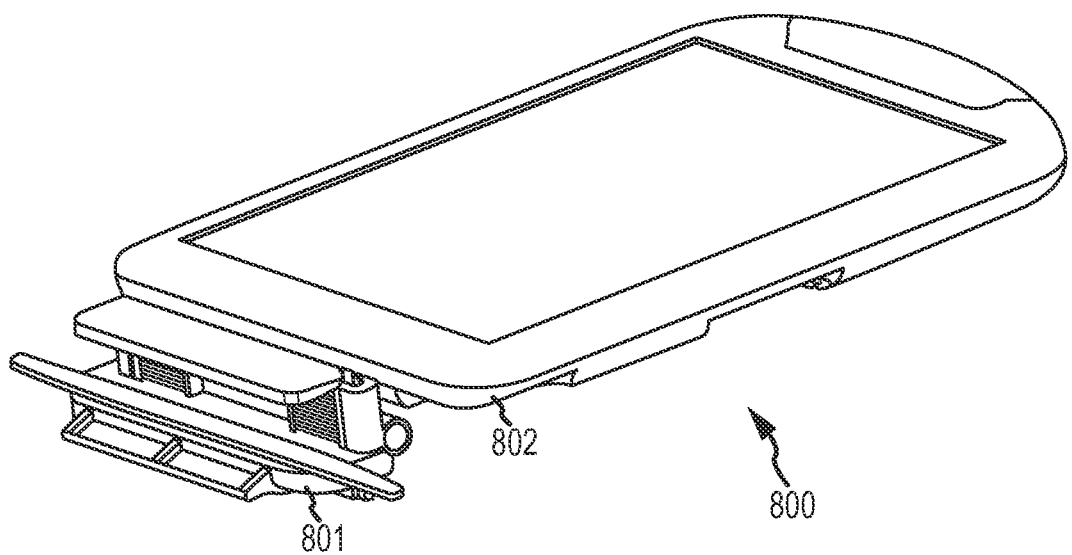
FIG. 9 shows a bottom isometric view, illustrating the removable attachment mechanism of FIG. 8.

FIG. 9 shows a bottom isometric view of the removable attachment mechanism 801 of FIG. 8. FIG. 9 illustrates a lower view of the removable attachment mechanism 801. FIG. 9 also illustrates a front surface of the secondary computing device display 802. As illustrated, the front surface of the secondary computing device display 802 includes a screen for displaying images received from a computing device.

Figure 10A:
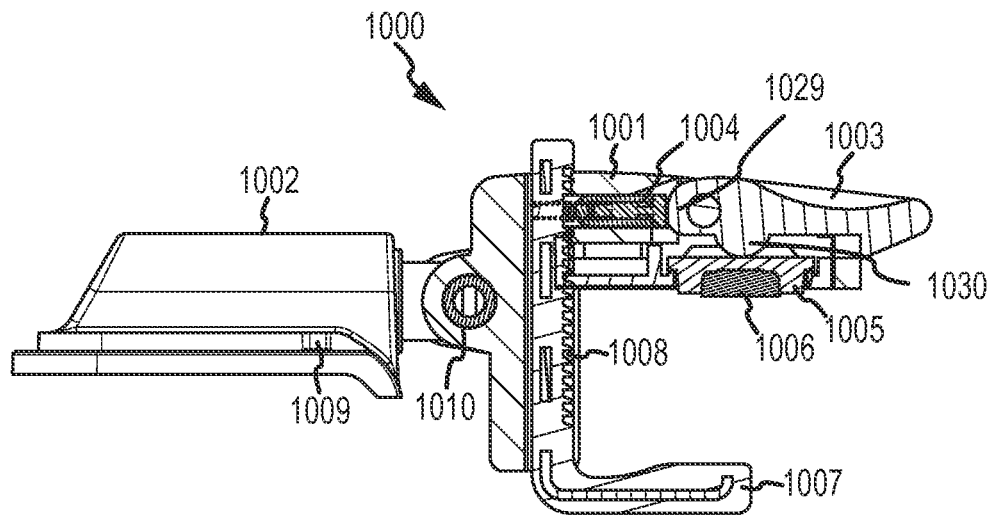
FIG. 10A shows a side cross-sectional view of the removable attachment mechanism of FIG. 8, illustrating a cross-section of a second attachment member of the removable attachment mechanism.
Figure 10B:
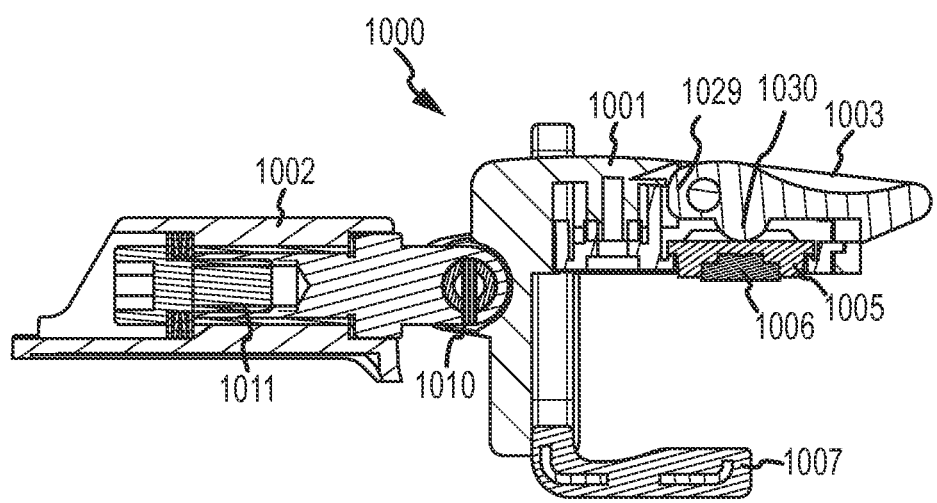
FIG. 10B shows a side cross-sectional view of the removable attachment mechanism of FIG. 8, illustrating a cross-section of a first attachment member of the removable attachment mechanism.
Figure 10C:
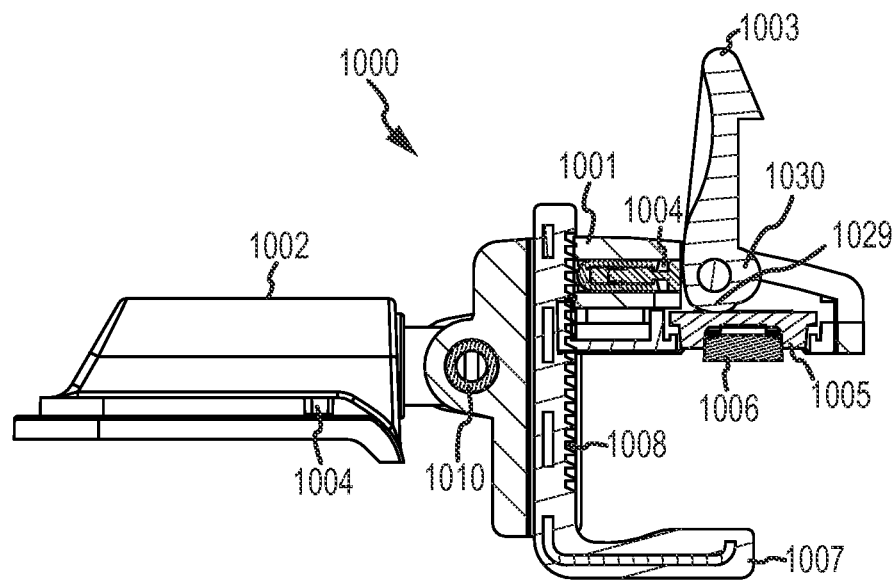
FIG. 10C shows a side cross-sectional view of the removable attachment mechanism of FIG. 8, illustrating a cross-section of a second attachment member of the removable attachment mechanism.

FIGS. 10A and 10C show a side cross-sectional view of the removable attachment mechanism 801 of FIG. 8, illustrating a cross-section of a second attachment member, including a first clamping portion 1001 and a second clamping portion 1007. The first clamping portion 1001 may include a clamp locking lever 1003, at least one clip mechanism 1004, pressure mechanism 1005, and a first frictionally mounted shaft 1010. The first frictionally mounted shaft 1010 may be frictionally mounted within the first clamping portion 1001 (as shown). The second clamping portion 1007 may include engaging mechanism 1008, which may include a ridged surface. As illustrated in FIGS. 10A-10D, the second clamping portion 1007 is operable to engage the first clamping portion 1001 to define a gap between the interior surfaces of the second clamping portion 1007 and first clamping portion 1001 (the "clamping gap". The width of this clamping gap may be varied by passing the at least one engaging mechanism 1008 through at least one aperture of the first clamping portion 1001 and adjusting the relative position of the engaging mechanism with the aperture. The first clamping portion 1001 may be operable to lock the second clamping portion 1007 to the first clamping portion when the clamp locking lever 1003 is in a first, engaged position (shown in FIG. 10A). The first clamping portion 1001 may allow the second clamping portion 1007 to move with respect to the first clamping portion 1001 when the clamp locking lever 1003 is in a second, disengaged position (shown in FIG. 10C). The first clamping portion 1001 and the second clamping portion 1007 may be operable to removably attach to a primary computing device display by removably clamping at least a portion of the primary computing device display within the clamping gap. In alternative embodiments, other removable clamping materials and methods including, but not limited to, a bar clamp, a c-clamp, a spring clamp, etc., may be utilized.

The at least one clip mechanism 1004 may be spring-biased to not engage the ridged surface of the engaging mechanism 1008 (as shown in FIG. 10C), allowing the second clamping portion 1007 (and associated ridged engaging mechanism 1008) to move with respect to the first clamping portion 1001. An end 1029 of the clamp locking lever 1003 may exert pressure on the clip mechanism 1004 to overcome the spring bias and force the clip mechanism 1004 to engage the ridged surface of the at least one engaging mechanism 1008 when the clamp locking lever 1003 is in in the first position (as shown in FIG. 10A), thereby locking the second clamping portion 1007 to the first clamping portion 1001. The at least one clip mechanism 1004 may contact the ridged surface of the at least one engaging mechanism 1008 (as shown in FIG. 10C) when the clamp locking lever 1003 is in is in the second position even though the at least one clip mechanism 1004 may be spring-biased to not engage the ridged surface when not subject to external force. Thus, even though the at least one clip mechanism 1004 may abut or be nearby the ridged surface of the at least one engaging mechanism 1008 (as shown in FIG. 10C), the at least one clip mechanism 1004 typically does not engage the ridged surface of the at least one engaging mechanism 1008 when the clamp locking lever 1003 is in is in the second position. In alternative embodiments, other locking materials and methods including, but not limited to, ratchets, screws, etc., may be utilized.

An adapter 1006 may be attached to a surface of the primary computing display to facilitate engagement of the primary computing display with the pressure mechanism 1005 and, ultimately, the clamp 1000. Adapter 1006 may be mounted to the primary computing device display utilizing a mounting mechanism including, but not limited to, an adhesive (including, but not limited to glue), magnets, and/or other attachment mechanisms. Alternatively, the surface of the primary computing device display may be manufactured such that the adapter 1006 is incorporated into the primary computing device display. Adapter 1006 may include a plurality of notches and ridges which match up to a plurality of notches and ridges on the pressure mechanism 1005, allowing the adapter 1006 to engage the pressure mechanism 1005. In alternative embodiments, a surface of the primary computing device display may be modified to directly engage the pressure mechanism 1005 without use of the intermediary adapter 1006.

The pressure mechanism 1005 may be operable to engage the surface of the primary computing device display (and/or the adapter 1006) clamped within the clamping gap (as shown in FIG. 10A). The pressure mechanism 1005 may be operable to engage the surface of the primary computing device display by exerting pressure on the surface of the primary computing device display. The pressure mechanism 1005 may exert such pressure when the clamp locking lever 1003 is in the first position. A protrusion 1030 formed on an exterior surface of the clamp locking lever 1003 may abut and force downward the pressure mechanism 1005 when the clamp locking lever 1003 is in the engaged position, thereby causing the pressure mechanism 1005 move into a frictionally or mechanically engaged position with the adapter 1006 or surface of the primary display. Conversely, the protrusion 1030 may disengage from, and thus not exert force on, the pressure mechanism 1005 when the clamp locking lever 1003 is in the disengaged position, thus permitting the pressure mechanism to disengage (frictionally, mechanically, or combinationally) from the adapter 1006 and/or surface of the display (as shown in FIG. 10C). Accordingly, when the clamp locking lever is in the engaged position, the pressure mechanism cooperates with the second clamping portion 1007 to trap and hold fast a portion of the primary computing device display. This, in turn, prevents or reduces the likelihood that the clamp, and by extension any attached secondary display, will move with respect to the primary display. Conversely, when the clamp locking lever 1003 is in the disengaged position, the clamp 1000 may generally freely move with respect to the primary computing device display. Thus, the clamp and associated secondary computing device display may be repositioned or removed when the clamp locking lever is in the disengaged position. In alternative embodiments, other pressure materials and methods including, but not limited to, cams, ratchets, screws, etc., may be utilized.

Figure 10D:
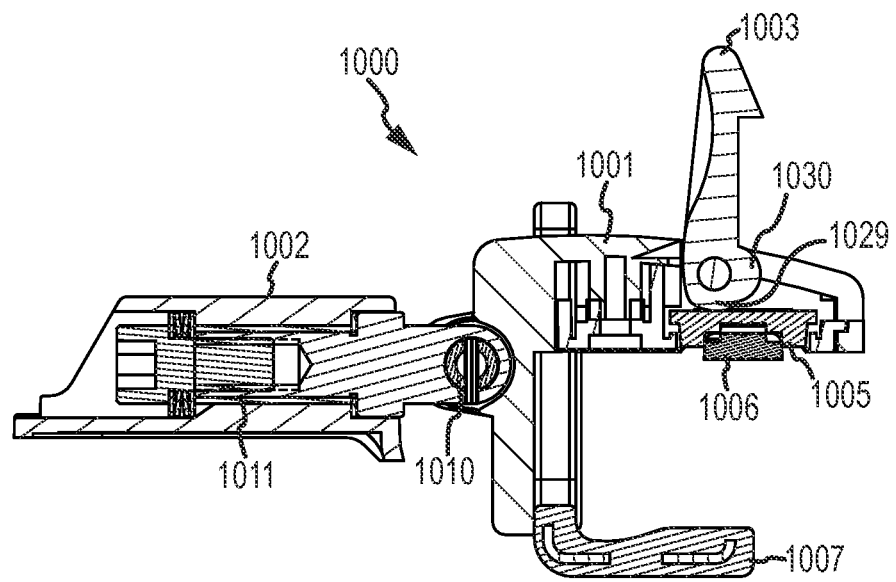
FIG. 10D shows a side cross-sectional view of the removable attachment mechanism of FIG. 8, illustrating a cross-section of a first attachment member of the removable attachment mechanism.

FIGS. 10B and 10D show a side cross-sectional view of the removable attachment mechanism 801 of FIG. 8, illustrating a cross-section of the first attachment member 1002 as well as a second cross-sectional view of the first clamping portion 1001 and second clamping portion 1007. The first attachment member 1002 may include a second frictionally mounted shaft 1011. The second frictionally mounted shaft 1011 may be frictionally mounted within the first attachment member 1002 (as shown). (It should be noted that either of both of the frictionally mounted shafts may be mechanically, adhesively or otherwise coupled instead of friction fitted.) The second frictionally mounted shaft 1011 may be coupled to the first frictionally mounted shaft 1010. The first attachment member 1002 may be rotatable along a first axis and a second axis such that the first attachment member 1002 rotates along the first axis when the first frictionally rotatably mounted shaft rotates and along the second axis when the second frictionally rotatably mounted shaft rotates. As shown in FIGS. 10B and 10D, the first axis of rotation is generally perpendicular to the second axis of rotation. In combination with the lateral motion afforded by the engaging mechanism 1008, the clamp 1000 may be thought of as having three degrees of mechanical freedom, ignoring the ability to vary the positioning of the clamp along the surface of a primary computing display.

Presuming the first clamping portion 1001 and second clamping portion 1007 are not affixed to an immobile surface, the second attachment member (made of the first clamping portion 1001 and the second clamping portion 1007) may be frictionally rotatable along the first axis and the second axis such that the first attachment member 1002 rotates along the first axis when the first frictionally rotatably mounted shaft rotates and along the second axis when the second frictionally rotatably mounted shaft rotates. The first frictionally mounted shaft 1010 and the second frictionally mounted shaft 1011 may be frictionally mounted in that they are mounted to rotate under sufficient force (such as that generated by a person's hand), but are frictionally held in place when not subject to outside force. The first frictionally mounted shaft 1010 and the second frictionally mounted shaft 1011 may be frictionally mounted utilizing one or more frictional rotation mechanisms (including, but not limited to, one or more washers, springs, belleville springs, and/or belleville washers) that enable rotation but utilize friction to restrict the enabled rotation. Thus, the first frictionally mounted shaft 1010 and the second frictionally mounted shaft 1011 may be rotated, but do not rotate freely in the absence of pressure sufficient to overcome the friction. In alternative embodiments, other frictional rotation materials and methods including, but not limited to, ball joints magnets, gears, etc., may be utilized.

The part of the second clamping portion 1007 that partially defines the clamping gap may include a pad (not shown) to aid in removably clamping the at least a portion of the primary computing device display within the gap. The pad may aid in creating friction when removably clamping the at least a portion of the primary computing device display and may be at least partially protect the primary computing device display against damage from the removable attachment mechanism 801. The pad may include, but is not limited to, a rubber pad and/or a silicon rubber pad. In alternative embodiments, other pad materials and methods utilizing materials including, but not limited to, plastics, other rubbers, fabric, etc., may be utilized.

Figure 10E:
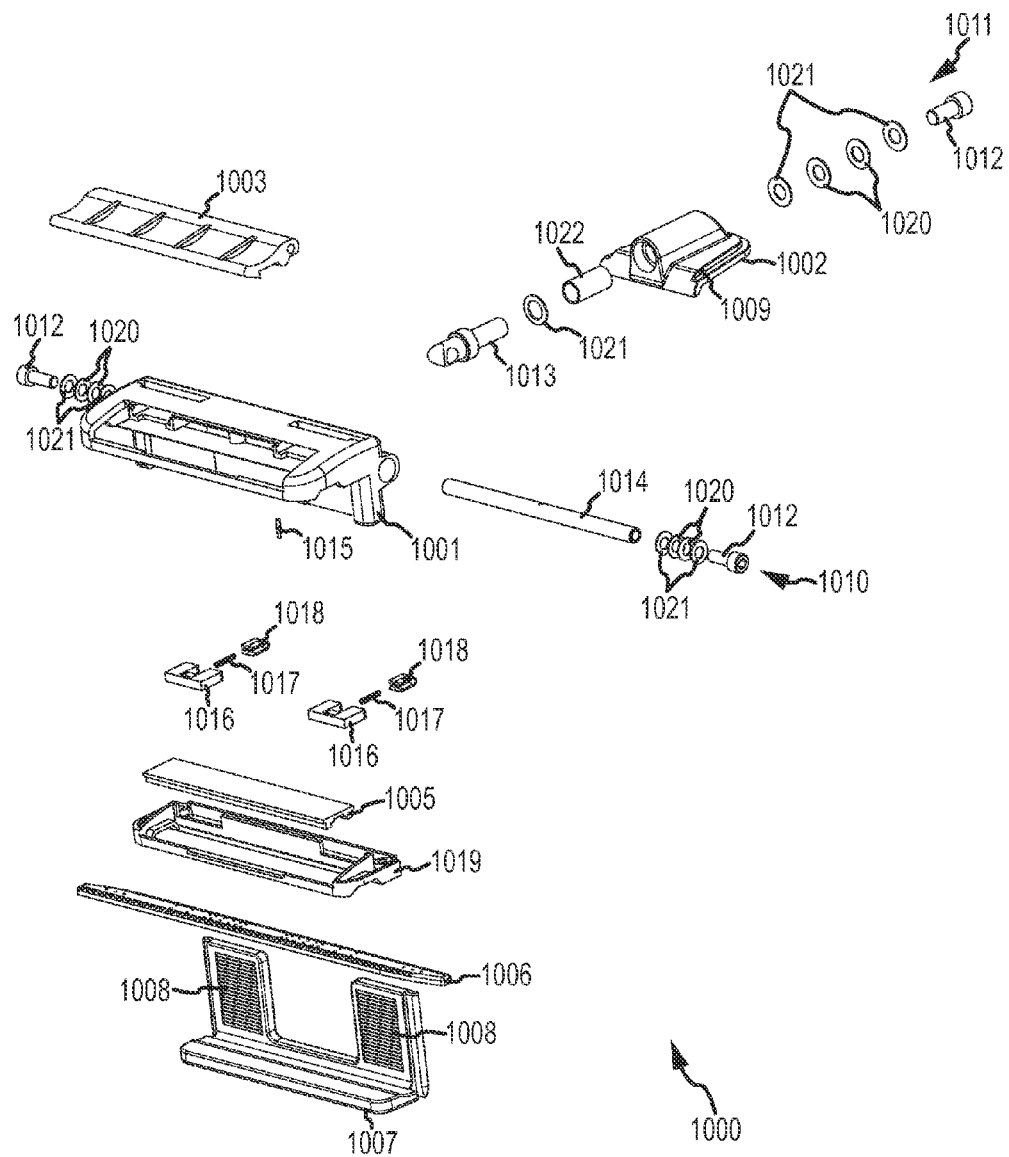
FIG. 10E shows a top isometric exploded view, illustrating the removable attachment mechanism of FIG. 8.
Figure 10F:
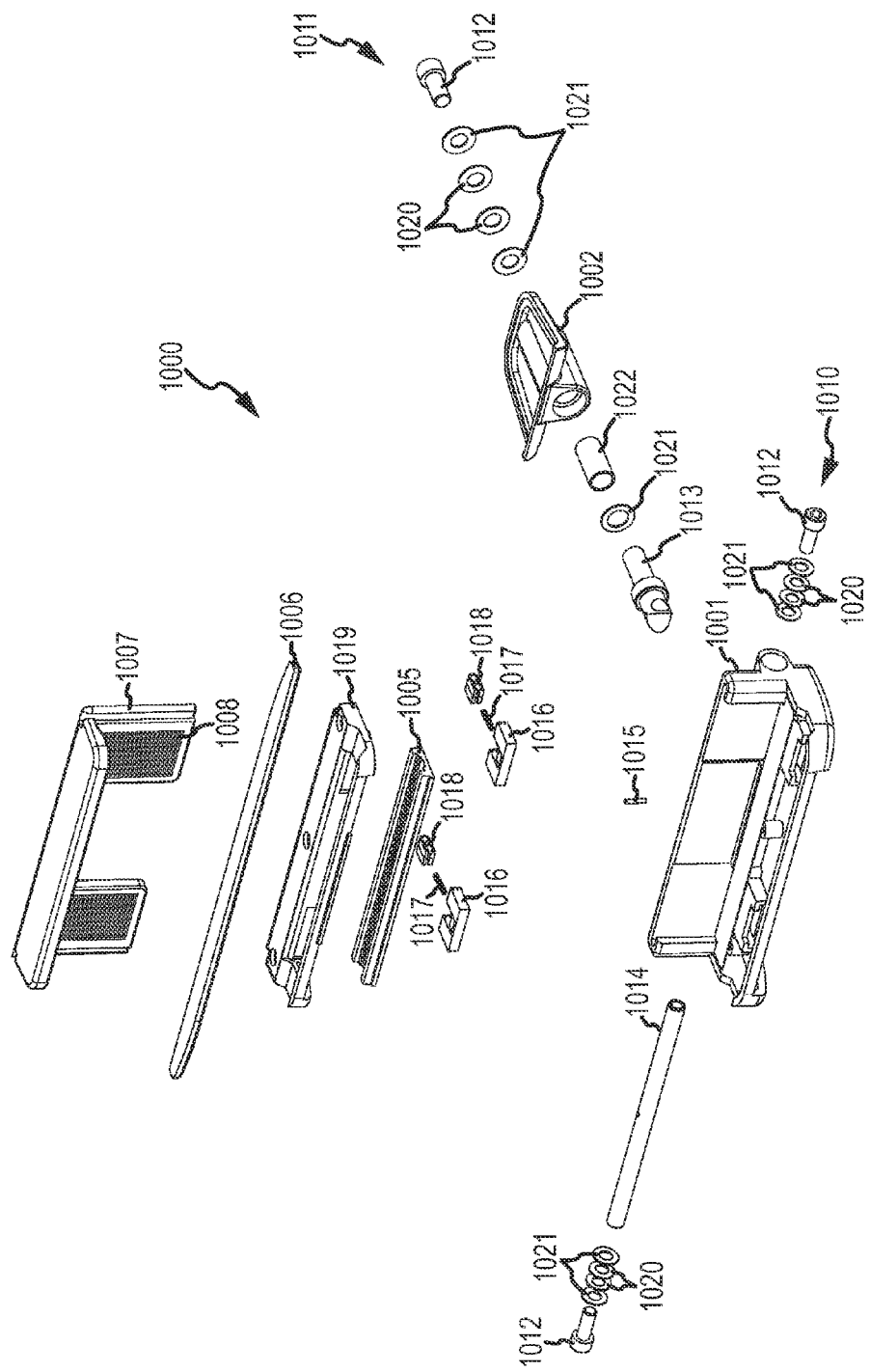
FIG. 10F shows a bottom isometric exploded view, illustrating the removable attachment mechanism of FIG. 8.

FIG. 10E shows a top isometric exploded view of the removable attachment mechanism 801 of FIG. 8. FIG. 10F shows a bottom isometric exploded view of the removable attachment mechanism 801 of FIG. 8. As shown, the pressure mechanism 1005 may be operably coupled to the first clamping portion 1001 utilizing pressure mechanism housing 1019. Also as shown, the at least one clip mechanism 1004 mounted within the first clamping portion 1001 may include clip mount 1016, clip spring 1017, and clip 1018.

As shown in these Figures, the first frictionally mounted shaft 1011 may include attachment piece 1013, bearing 1022, screw 1012, one or more washers 1021, and one or more belleville springs 1020. Bearing 1022 may be molded in place within the first attachment member 1002. The first frictionally mounted shaft 1011 may be assembled by inserting the attachment piece 1013 through the one or more washers 1021 (only one shown) and the bearing 1022 (which is within the first attachment member 1002) and inserting the screw 1012 through the one or more washers 1021, the one or more belleville springs 1020, and the bearing 1022 (which is within the first attachment member 1002) to connect the screw 1012 with the attachment piece 1013. Also as shown, the second frictionally mounted shaft 1010 may include lateral shaft 1014, screws 1012, one or more washers 1021, one or more belleville springs 1020, and attachment pin 1015. The second frictionally mounted shaft 1010 may be assembled inserting the screws 1012 through the one or more washers 1021 and the one or more belleville springs 1020 to connect the screws 1012 with the lateral shaft 1014 within the first clamping portion 1001. The first frictionally mounted shaft 1011 and the second frictionally mounted shaft 1010 may be coupled by inserting the attachment piece 1013 into the first clamping portion 1001, inserting the lateral shaft 1014 through an aperture in the attachment piece 1013, and inserting the attachment pin 1015 through holes in both the attachment piece 1013 and the lateral shaft 1014. In alternative embodiments, other frictional mounting materials and methods including, but not limited to, ball joints, magnets, etc., may be utilized.

As shown, the adapter 1006 (best seen in FIG. 10E) may be adapted to engage the pressure mechanism 1005 by including a plurality of ridges and notches. Also as shown, the pressure mechanism 1005 (best seen in FIG. 10F) may be adapted to engage the adapter 1006 by including a plurality of ridges and notches. The plurality of ridges and notches of the adapter 1006 and the plurality of notches and ridges of the pressure mechanism 1005 may be configured (as shown) such that the ridges of the adapter 1006 match up to the notches of the pressure mechanism 1005 and the notches of the adapter 1006 match up to the ridges of the pressure mechanism 1005. Thus, the ridges of the adapter 1006 are configured to engage the notches of the pressure mechanism 1005 and the notches of the adapter 1006 are configured to engage the ridges of the pressure mechanism 1005. By engaging the adapter 1006 with the pressure mechanism 1005, the removable attachment mechanism 801 is operable to utilize friction to reduce the amount of pressure sufficient to removably clamp the primary computing device display. In alternative embodiments, other engaging materials and methods including, but not limited to, magnets, adhesive, etc., may be utilized.

Although the adapter 1006 is illustrated as a contiguous strip, it should be understood that other adapters 1006 may be utilized without departing from the scope of the present disclosure. For example, one or more strips, dots, or other shaped adapters 1006 (which may be contiguous or non-contiguous) may be utilized. In other alternative embodiments, the removable attachment mechanism 801 may removably clamp to a stand (not shown) instead of or in addition to the primary computing device display. In such other alternative embodiments, the adapter 1006 may be mounted to such a stand and/or the stand may be manufactured such that the adapter 1006 is incorporated into the stand.

The operation of the removable attachment mechanism 801 will now be described with reference to FIGS. 8, 9, and 10A-10F. The first attachment member 804 is slid into to the at least one groove 805 of the at least one secondary computing device display 802 to lockably attach the first attachment member 804 to the at least one secondary computing device display 802 by engaging the one or more detents (best viewed as 1009 in FIG. 10A) with one or more notches in the at least one groove 805.

The second clamping portion 1007 engages the first clamping portion 1001 to define the clamping gap by passing the at least one engaging mechanism 1008 through at least one aperture of the first clamping portion 1001. The first clamping portion 1001 allows the second clamping portion 1007 to move with respect to the first clamping portion 1001 as the clamp locking lever 1003 is in the disengaged position (shown in FIG. 10C). Part of the primary computing device display is positioned within the clamping gap. The second clamping portion 1007 is moved with respect to the first clamping portion 1001 to minimize the gap around the segment of the primary computing device display engaged in the clamping gap. Ideally, at least part of the primary computing device display should contact both the first clamping portion 1001 (or the pressure pad 1005) and the second clamping portion 1007 (or frictional pad). The clamp locking lever 1003 is moved to the engaged position (shown in FIG. 10A). As the clamp locking lever 1003 is moved to the engaged position, the clamp locking lever 1003 exerts pressure on the at least one clip mechanism 1004 to overcome the spring-bias and force the at least one clip mechanism 1004 to engage the ridged surface of the at least one engaging mechanism 1008, locking the second clamping portion 1007 to the first clamping portion 1001 (shown in FIG. 10A). Additionally, as the clamp locking lever 1003 is moved to the engaged position, the clamp locking lever 1003 exerts pressure on the pressure mechanism 1005 which causes the pressure mechanism 1005 to exert pressure on the surface of the primary computing device display (as shown in FIG. 10A), engaging the surface of the primary computing device display. Thus, the first clamping portion 1001 and the second clamping portion 1007 are removably clamped to the primary computing device display. Then, the at least one secondary computing device display 802 is then frictionally rotatable along the first axis and the second axis (with respect to the primary computing device display) by rotating the first or second frictionally mounted shafts and the primary computing device display is frictionally rotatable along the first axis and the second axis (with respect to the at least one secondary computing device display 802) by rotating the first or second frictionally mounted shafts.

Then, the clamp locking lever 1003 is moved to the disengaged position (shown in FIG. 10B). As the clamp locking lever 1003 is moved to the disengaged position, the clamp locking lever 1003 no longer exerts pressure on the at least one clip mechanism 1004. In the absence of pressure, the spring-bias causes the clip mechanism 1004 to not engage the ridged surface of the at least one engaging mechanism 1008, allowing the second clamping portion 1007 to move with respect to the first clamping portion 1001 (shown in FIG. 10B). Additionally, as the clamp locking lever 1003 is moved to the engaged position, the clamp locking lever 1003 no longer exerts pressure on the pressure mechanism 1005 such that the pressure mechanism 1005 no longer exerts pressure on the surface of the primary computing device display (as shown in FIG. 10B) and no longer engages the surface of the primary computing device display. Thus, the first clamping portion 1001 and the second clamping portion 1007 are no longer removably clamped to the primary computing device display. The second clamping portion 1007 is moved with respect to the first clamping portion 1001 to increase the gap around the at least a portion of the primary computing device display such that the primary computing device display may be removed from the gap.

Figure 11A:
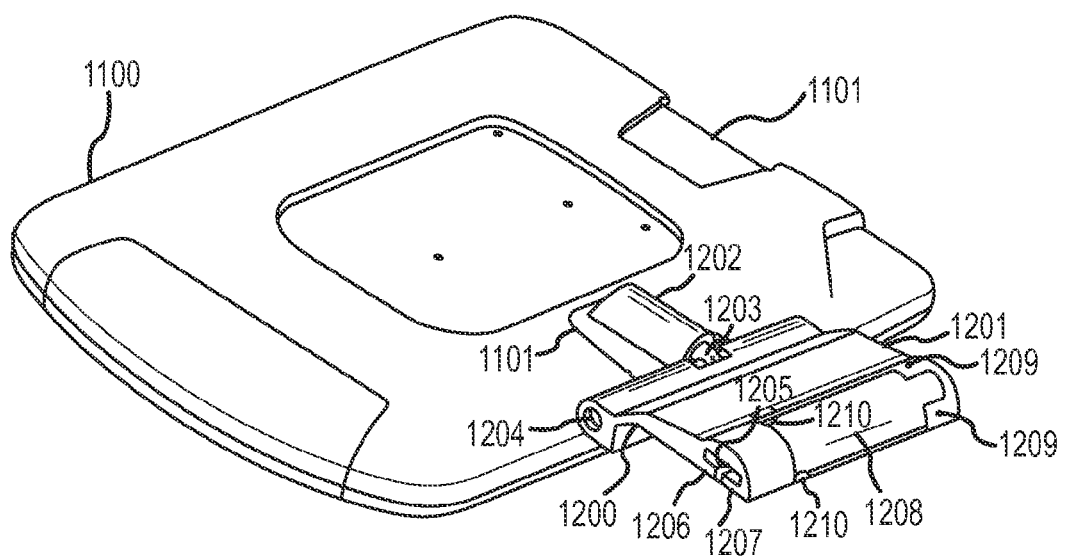
FIG. 11A shows a top isometric view, illustrating a removable attachment mechanism of the secondary computing device display system, according to a fourth alternative embodiment of the present disclosure.

FIG. 11A shows a top isometric view of a removable attachment mechanism 1200 attached to a secondary computing device display 1100, according to a fourth alternative embodiment of the present disclosure. A first attachment member 1202 of the removable attachment mechanism 1200 may slideably attach to at least one attachment groove 1101 formed on a surface of the secondary computing device display 1100. It should be noted that a single secondary display 1100 may include multiple attachment grooves 1101. For example, attachment grooves 1101 may be located on different sides or surfaces of the secondary display 1100. As illustrated, the first attachment member 1202 and that attachment groove 1101 may each include a first portion and a second portion such that the first portion is narrower than the second portion. The widths of the first and second portions of the first attachment member 1202 and the attachment groove 1101 may substantially correspond, enabling the first attachment member 1202 to slidably attach to the attachment groove 1101 by inserting the first attachment member 1202 into the attachment groove 1101. In some implementations the width of one or more portions of the first attachment member 1202 may be greater than the widths of one or more portions of the attachment groove 1101, resulting in pressure operable to lockably attach the first attachment member 1202 and the attachment groove 1101 when the first attachment member 1202 is inserted into the attachment groove 1101. In various implementations, the first attachment member 1202 and the attachment groove 1101 may include one or more corresponding detents and notches that are operable to engage and lockably attach the first attachment member 1202 and the attachment groove 1101 when the first attachment member 1202 is inserted into the attachment groove 1101.

The removable attachment mechanism 1200 also includes a second attachment member 1201 rotatably connected to the first attachment member 1202 utilizing a second rotatable shaft 1204 couple to a first rotatable shaft 1203. The second rotatable shaft 1204 may be frictionally mounted within the second attachment member 1201 and the first rotatable shaft 1203 may be frictionally mounted within the first attachment member 1202, allowing second rotatable shaft 1204 and the first rotatable shaft 1203 to be frictionally rotated. However it is understood that in various implementations that either of both of the frictionally mounted shafts may be mechanically, adhesively or otherwise coupled instead of friction fitted. The first rotatable shaft 1203 and the second rotatable shaft 1204 may be frictionally mounted in that they are mounted to rotate under sufficient force (such as that generated by a person's hand), but are frictionally held in place when not subject to outside force. The first rotatable shaft 1203 and the second rotatable shaft 1204 may be frictionally mounted utilizing one or more frictional rotation mechanisms (including, but not limited to, one or more washers, springs, belleville springs, and/or belleville washers) that enable rotation but utilize friction to restrict the enabled rotation. Thus, the first rotatable shaft 1203 and the second rotatable shaft 1204 may be rotated, but do not rotate freely in the absence of pressure sufficient to overcome the friction. In alternative implementations, other frictional rotation materials and methods including, but not limited to, ball joints magnets, gears, and so on, may be utilized.

The second rotatable shaft 1204 may be coupled to the first rotatable shaft 1203. The first attachment member 1202 may be rotatable along a first axis and a second axis such that the first attachment member 1202 rotates along the first axis when the first rotatable shaft 1203 rotates and along the second axis when the second rotatable shaft 1204 rotates. Presuming the second attachment member 1201 is not affixed to an immobile surface, the second attachment member 1201 may be frictionally rotatable along the first axis and the second axis such that the second attachment member 1201 rotates along the first axis when the first frictionally rotatably mounted shaft rotates and along the second axis when the second frictionally rotatably mounted shaft rotates. As shown in FIGS. 12A through 12F, the first axis of rotation is generally perpendicular to the second axis of rotation. Thus, the removable attachment mechanism 1200 may be thought of as having two degrees of mechanical freedom, ignoring the ability to vary the positioning of the second attachment member 1202 along the surface of a primary computing display.

Referring again to FIG. 11A, the second attachment member 1201 includes a clamping trench 1205 and a first and second clamping lips 1206 and 1207. The second attachment member 1201 also includes a clamp locking lever 1208, which is rotatably connected to the second attachment member 1201 utilizing a rotatable shaft 1209, and lever indents 1210. Although the clamp locking lever 1208 is described as rotatably connected to the second attachment member 1201 utilizing the rotatable shaft 1209, it is understood that in various implementations other mechanisms may be utilized to rotatably attach the clamp locking lever 1208 to the second attachment member 1201, such as ball joints, magnets, gears, and so on. As illustrated, the portion of the clamp locking lever 1208 over the lever indents 1210 may be wider than the lever indents 1210. This may aid grasping of the clamp locking lever 1208 for manipulation of the clamp locking lever 1208.

Figure 11B:
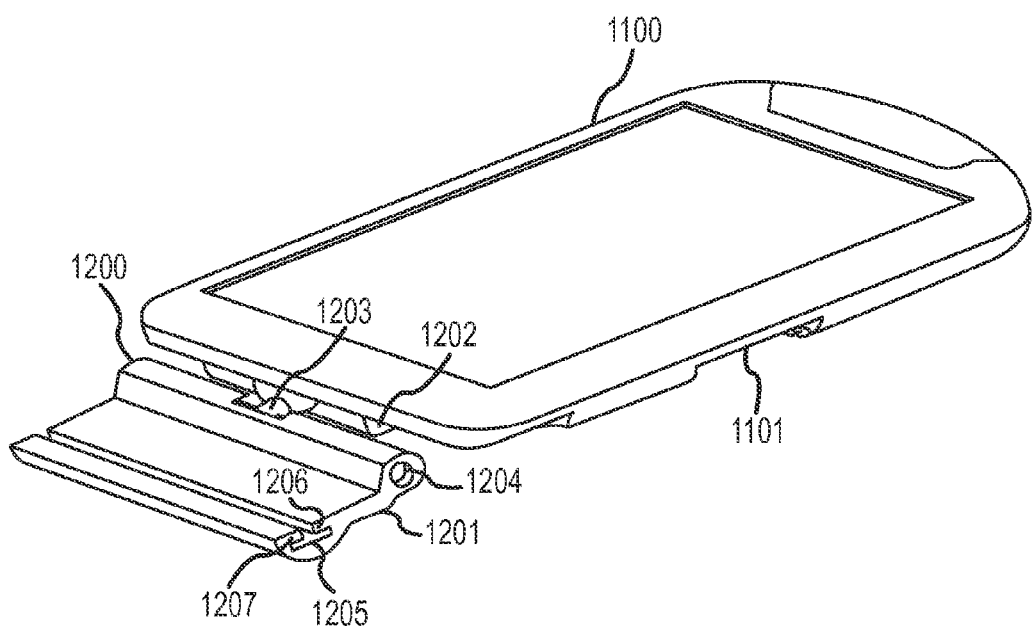
FIG. 11B shows a bottom isometric view, illustrating the removable attachment mechanism of FIG. 11A.

FIG. 11B shows a bottom isometric view of the removable attachment mechanism 1200 attached to a secondary computing device display 1100. As illustrated, the first and second clamping lips 1206 and 1207 are positioned on the first attachment member 1202 to partially cover the clamping trench 1205, defining an aperture over the clamping trench 1205 that is narrower than the clamping trench 1205. FIG. 11B also illustrates a front surface of the secondary computing device display 1100. As illustrated, the secondary computing device display 1100 includes a screen for displaying images received from a computing device.

Figure 12A:
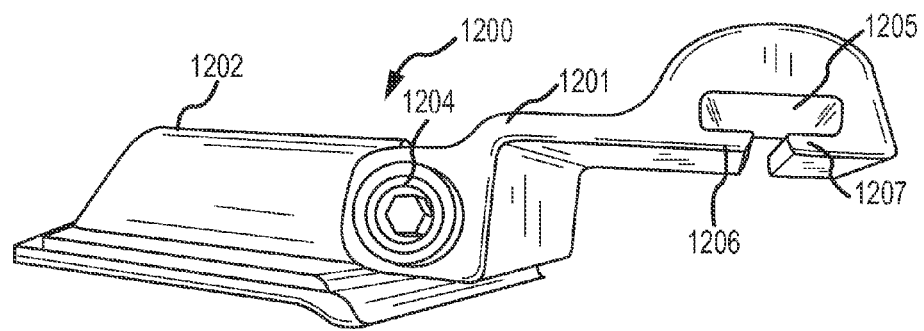
FIG. 12A shows a side view of the removable attachment mechanism of FIG. 11A, illustrating the locking lever of the second attachment member in the locked position.
Figure 12B:
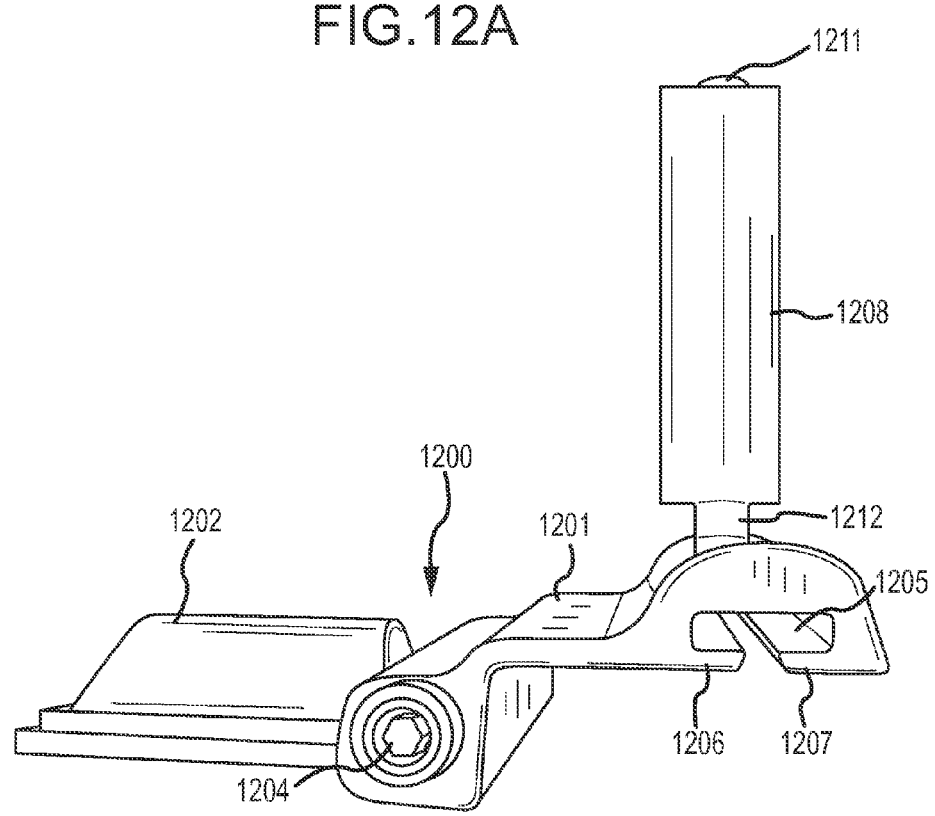
FIG. 12B shows a side view of the removable attachment mechanism of FIG. 11A, illustrating the locking lever of the second attachment member in the unlocked position.
Figure 12C:
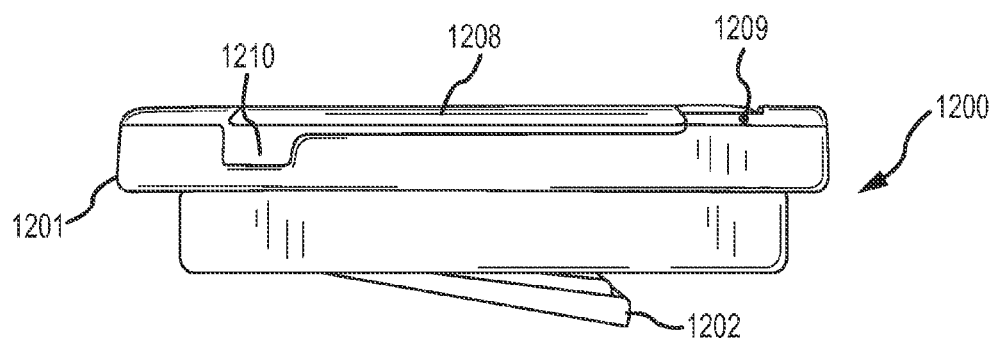
FIG. 12C shows a front view of the removable attachment mechanism of FIG. 11A, illustrating the locking lever of the second attachment member in the locked position.
Figure 12D:
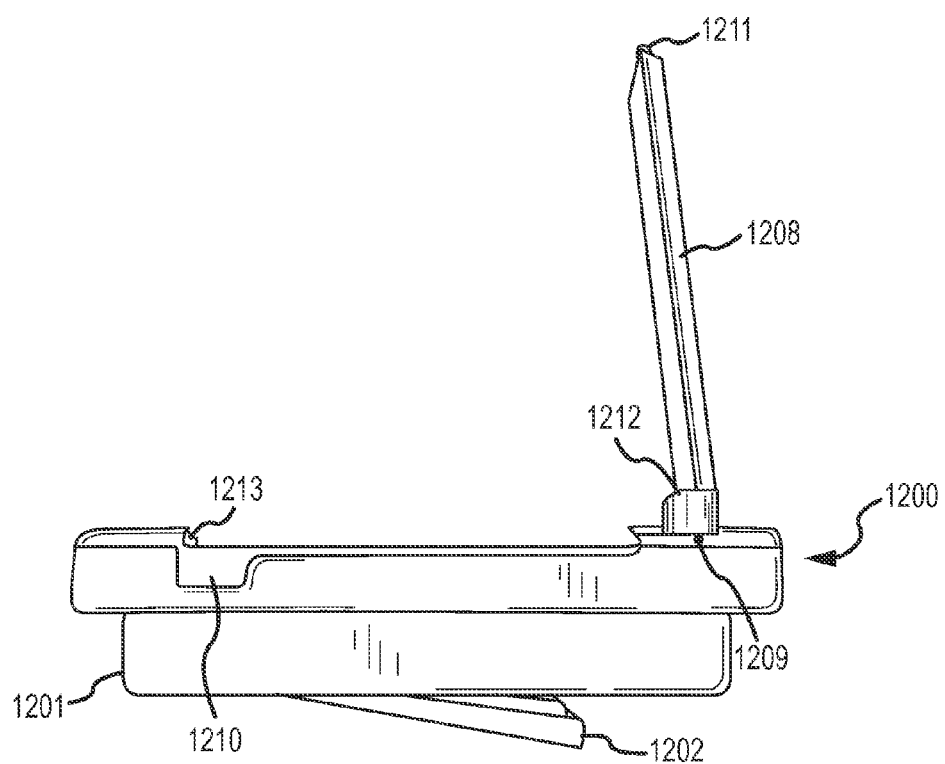
FIG. 12D shows a front view of the removable attachment mechanism of FIG. 11A, illustrating the locking lever of the second attachment member in the unlocked position.
Figure 12E:
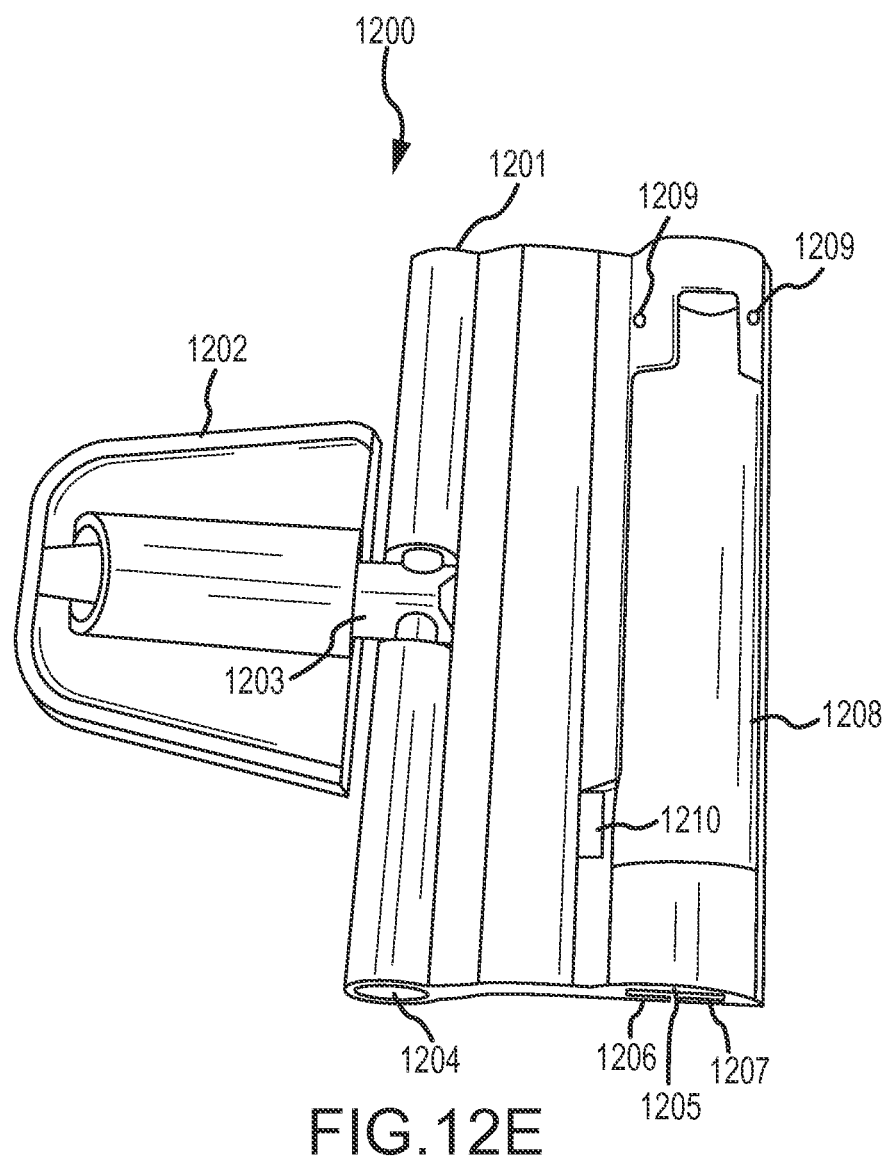
FIG. 12E shows a top view of the removable attachment mechanism of FIG. 11A, illustrating the locking lever of the second attachment member in the locked position.
Figure 12F:
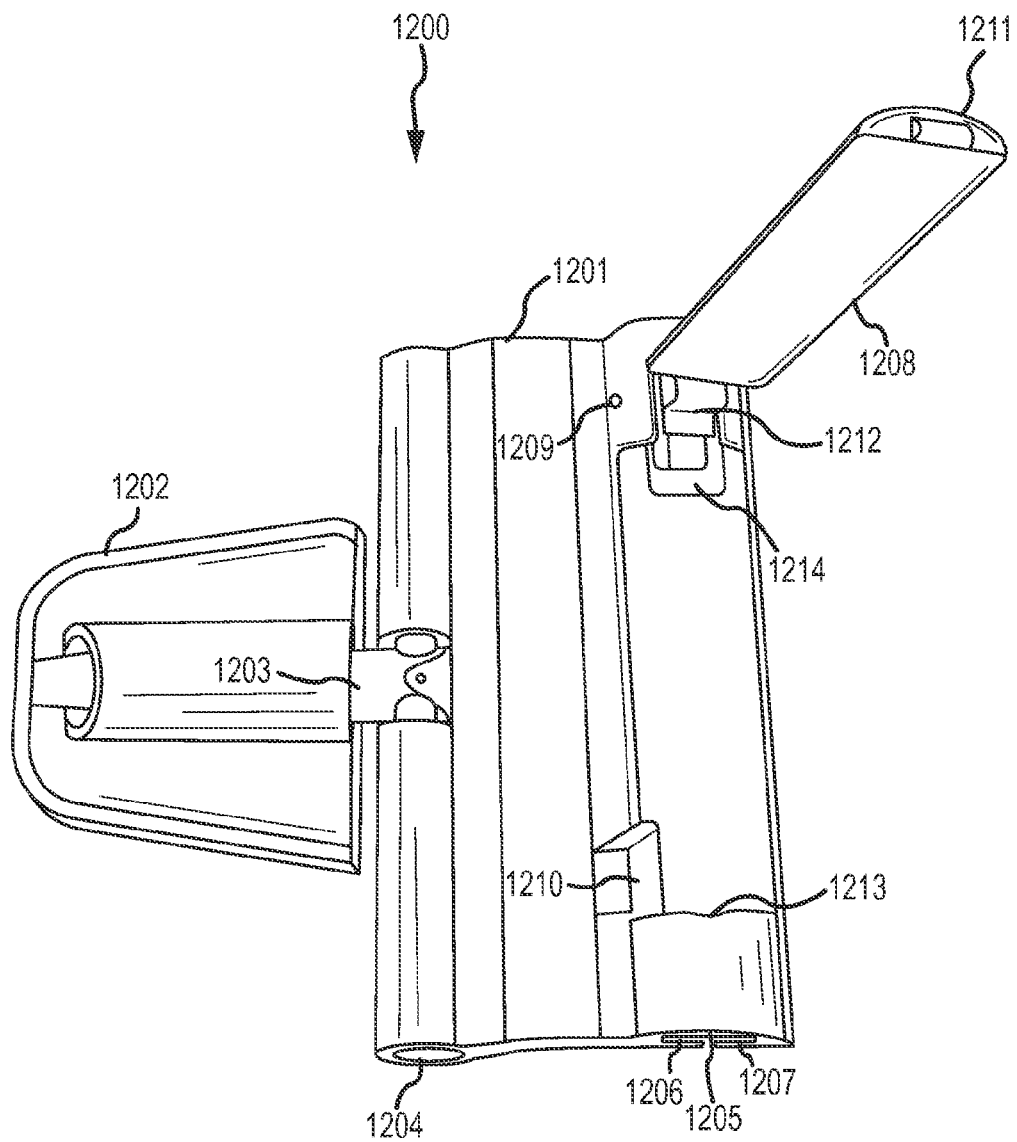
FIG. 12F shows a top view of the removable attachment mechanism of FIG. 11A, illustrating the locking lever of the second attachment member in the unlocked position.

FIGS. 12A and 12B show side views of the removable attachment mechanism 1200 of FIG. 11A. FIGS. 12C and 12D show front views of the removable attachment mechanism 1200 of FIG. 11A. FIGS. 12E and 12F show top views of the removable attachment mechanism 1200 of FIG. 11A. As illustrated, the clamp locking lever 1208 is operable between a first position (see FIGS. 12A, 12C, and 12E) and a second position (see FIGS. 12B, 12D, and 12F). The first position of the clamp locking lever 1208 may be a clamp lock position and the second position of the clamp locking lever 1208 may be a clamp unlock position.

As best illustrated in FIG. 12F, the clamp locking lever 1208 may include a lever locking protrusion 1211 and the second attachment member 1201 may include a lever locking notch 1213. When the clamp locking lever 1208 is in the first position, the lever locking protrusion 1211 may be operable to engage the lever locking notch 1213 to lock the clamp locking lever 1208 in the first position. When the clamp locking lever is moved to the second position, the lever locking protrusion 1211 may be operable to disengage from the lever locking notch 1213 to allow the unlock the clamp locking lever 1208 from the first position. Although the clamp locking lever 1208 is described as including the lever locking protrusion 1211 and the second attachment member 1201 is described as including the lever locking notch 1213, it is understood that any number of protrusions and notches, disposed on the clamp locking lever 1208 and/or the second attachment member 1201, may be utilized to lock the clamp locking lever 1208 in the first position. Further, it is understood that mechanisms other than notches and protrusions may be utilized to lock the clamp locking lever 1208 in the first position in various implementations, such as magnets, clasps, and so on. Additionally, it is understood that some implementations may not lock the clamp locking lever 1208 in the first position.

Figure 12G:
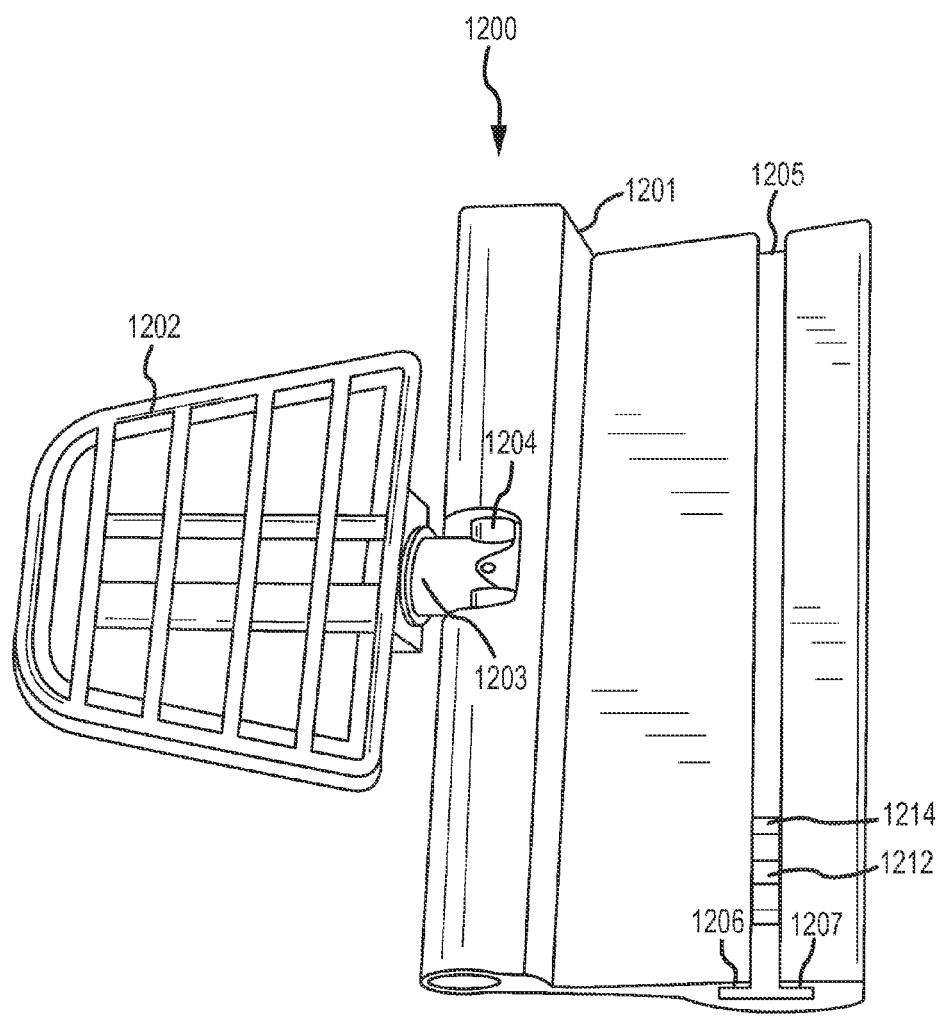
FIG. 12G shows a side view of the removable attachment mechanism of FIG. 11A.
Figure 13A:
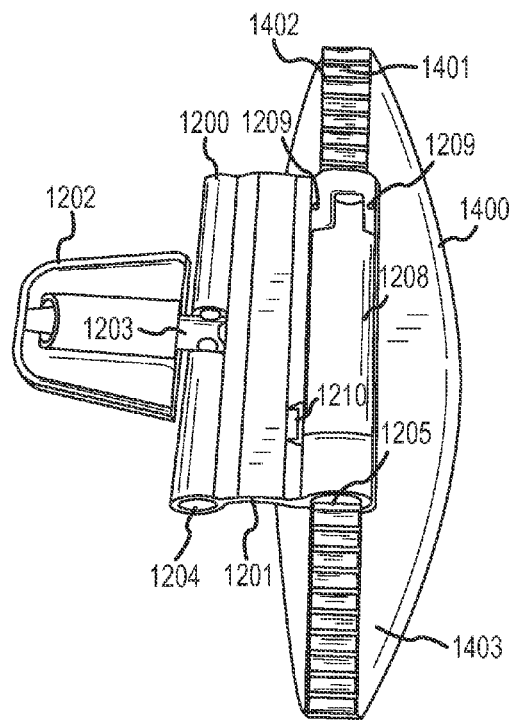
FIG. 13A shows a top view of the removable attachment mechanism of FIG. 11A coupled removably clamped to a clamping adapter.
Figure 13B:
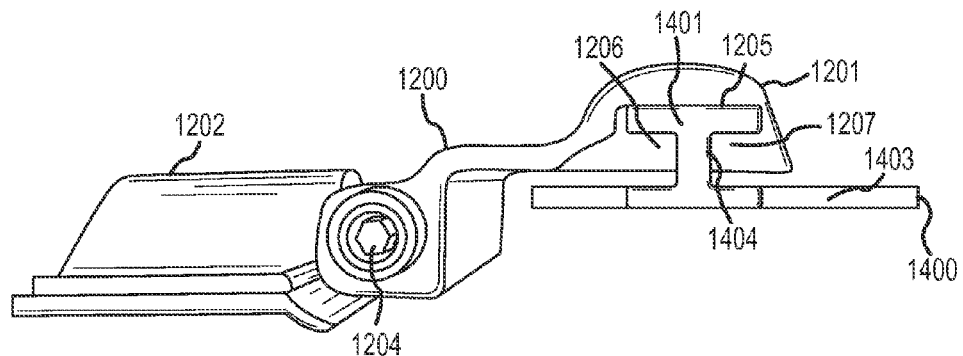
FIG. 13B shows a side view of the removable attachment mechanism of FIG. 11A coupled removably clamped to a clamping adapter.
Figure 13C:
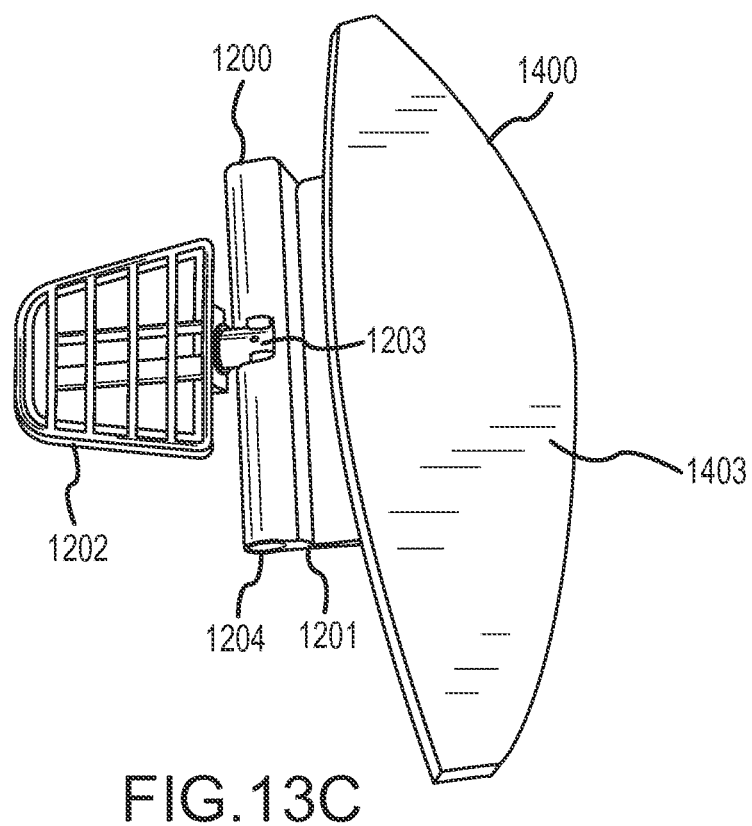
FIG. 13C shows a bottom view of the removable attachment mechanism of FIG. 11A coupled removably clamped to a clamping adapter.
Figure 13D:
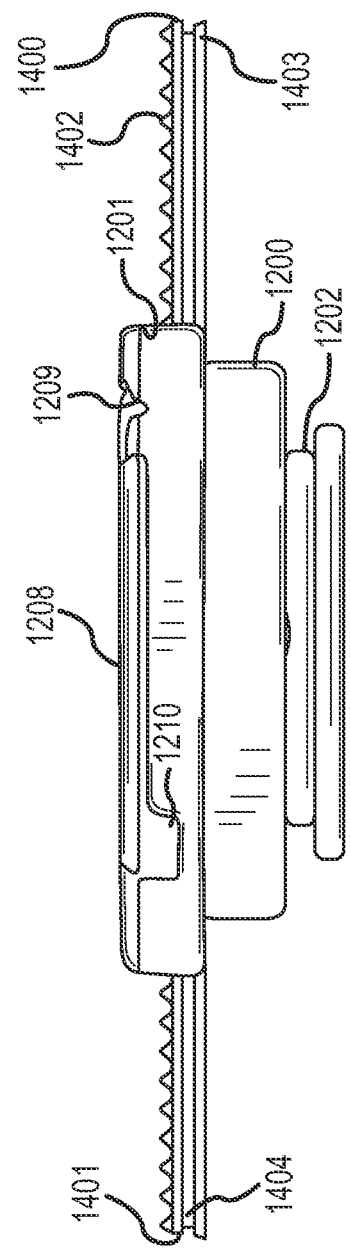
FIG. 13D shows a front view of the removable attachment mechanism of FIG. 11A coupled removably clamped to a clamping adapter.

The clamp locking lever 1208 may include a clamp locking mechanism 1212 the second attachment member 1201 may include a clamp locking aperture 1214. As illustrated, the clamp locking aperture 1214 may be an aperture in the second attachment member 1201 into the clamping trench 1205. When the clamp locking lever 1208 is in the first position, the clamp locking mechanism 1212 may project through the clamp locking aperture 1214 into the clamping trench 1205 (see FIG. 12G, which shows a bottom view of the removable attachment mechanism 1200 of FIG. 11A). When the clamp locking lever 1208 is in the second position, the clamp locking mechanism 1212 may be positioned outside of the clamping trench 1205, not projecting through the clamp locking aperture 1214 (see FIG. 12F).

Figure 14A:
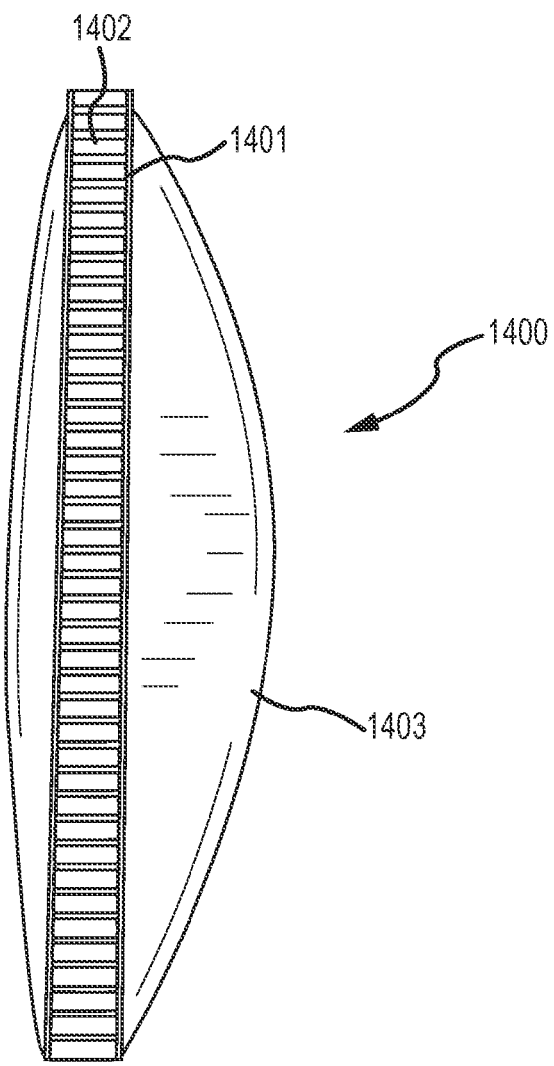
FIG. 14A shows a top view of the clamping adapter of FIG. 13A.

FIG. 14A is a top view of a clamping adapter 1400 that is operable to be removably clamped by the second attachment member 1201. As illustrated, the clamping adapter 1400 includes a clamping ridge 1401 and a base 1403. In FIG. 14A, the base 1403 is illustrated as having a substantially ovoid non-geometric shape. However, in various implementations the base may have a variety of geometric or non-geometric shapes such as circular, square, triangular, and so on. As further illustrated, the clamping ridge 1401 includes a clamp locking engaging surface 1402. The clamp locking engaging surface 1402 may include a plurality of notches.

The base 1403 of the clamping adapter 1400 may be attached to a surface of the primary computing display to facilitate engagement of the primary computing display with the second attachment member 1201 and, ultimately, the removable attachment mechanism 1200. The base 1403 of the clamping adapter 1400 may be mounted to the primary computing device display utilizing a mounting mechanism including, but not limited to, an adhesive (including, but not limited to glue), magnets, and/or other attachment mechanisms. Alternatively, the surface of the primary computing device display may be manufactured such that the clamping adapter 1400 is incorporated into the primary computing device display such that the surface of the primary computing device display is the base 1403.

In other implementations, the removable attachment mechanism 1200 may removably clamp to a stand (not shown) instead of or in addition to the primary computing device display. In such other alternative embodiments, the clamping adapter mount 1400 may be mounted to such a stand and/or the stand may be manufactured such that the clamping adapter mount 1400 is incorporated into the stand.

Figure 14B:
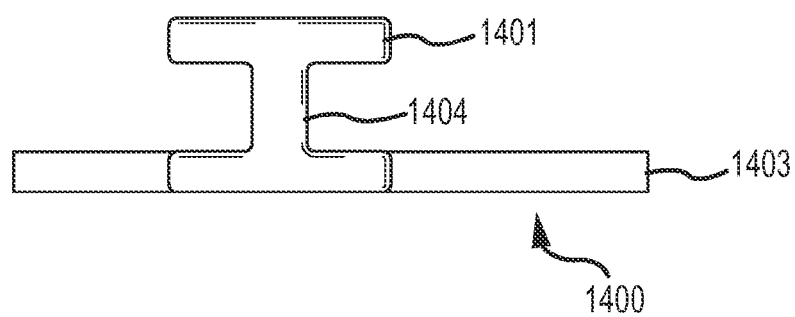
FIG. 14B shows a side view of the clamping adapter of FIG. 13A.
Figure 14C:
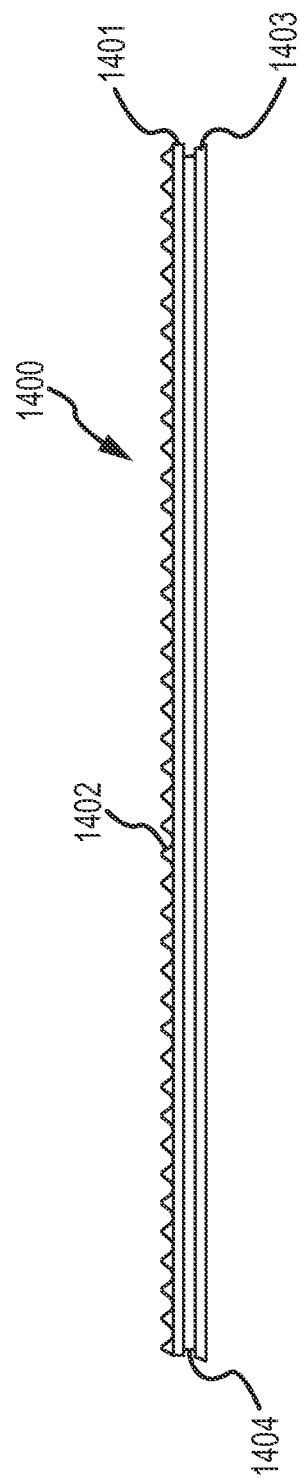
FIG. 14C shows a front view of the clamping adapter of FIG. 13A.

FIG. 14B is a side view of the clamping adapter 1400. As illustrated, the clamping ridge 1401 includes a clamping post 1404 that couples the clamping ridge 1401 to the base 1403. Also as illustrated, the width of the clamping ridge 1401 is wider than that of the clamping post 1404. FIG. 14C illustrated a front view of the clamping adapter 1400.

FIGS. 13A through 13D illustrate the removable attachment mechanism 1200 coupled to the clamping adapter 1400. As illustrated, in FIGS. 13A, 13B, and 13D, when the clamping adapter 1400 is coupled to the removable attachment mechanism 1200, the clamping ridge 1401 is positioned at least partially within the clamping trench 1205 and the clamping post 1404 is positioned at least partially within the aperture defined between clamping lips 1206 and 1207. When the clamp locking lever 1208 is in the first position, the clamp locking mechanism 1212 may be operable to engage the clamp locking engaging surface 1402 to lock the clamping adapter 1400 to the second attachment member 1201. When the clamping adapter 1400 is locked to the second attachment member 1201, the clamping ridge 1401 may not be slideable with respect to the second attachment member 1201.

In some implementations, the dimensions of the clamping trench 1205, the clamping lips 1206 and 1207, the clamping ridge 1401, the clamping post 1404, and/or the clamp locking engaging surface 1402 may correspond such that the clamping ridge 1401 is held within the clamping trench 1205 and/or the clamping post 1404 is held within the clamping lips 1206 and 1207 with sufficient force such that the clamping ridge 1401 is frictionally slideable perpendicular to the second attachment member 1201 when the clamp locking lever 1208 is in the second position. The clamping ridge 1401 is frictionally slideable in that it slides under sufficient force (such as that generated by a person's hand), but is frictionally held in place when not subject to outside force. In other implementations, the dimensions of the clamping trench 1205, the clamping lips 1206 and 1207, the clamping ridge 1401, the clamping post 1404, and/or the clamp locking engaging surface 1402 may correspond such that the clamping ridge 1401 is slideable perpendicular to the second attachment member 1201 regardless whether subject to outside force when the clamp locking lever 1208 is in the second position.

The operation of the removable attachment mechanism 1200 will now be described with reference to FIGS. 11A and 11B and 13A through 13D. The first attachment member 1202 is slid into to the attachment groove 1101 of the secondary computing device display 1100 to slideably attach the first attachment member 1202 to the secondary computing device display 1101.

The clamp locking lever 1208 of the second attachment member 1201 is moved to the second position. This causes the lever locking protrusion 1211 to disengage from the lever locking notch 121. This also causes the clamp locking mechanism 1212 to be removed from the clamping trench 1205 via the clamp locking aperture 1214.

Next, the second attachment member 1201 is coupled to the clamping adapter 1400 by inserting the clamping ridge 1401 into the clamping trench 1205 and the clamping post 1404 into the aperture between the clamping lips 1206 and 1207. As the clamp locking lever 1208 is in the second position, the clamp locking ridge 1401 is slideable within the clamping trench 1205 perpendicular with respect to the second attachment member 1201. The clamp locking ridge 1401 is slid within the clamping trench 1205 until the clamping ridge 1401 is positioned at least partially within the clamping trench 1205 and the clamping post 1402 is positioned at least partially between the clamping lips 1206 and 1207.

The clamp locking lever 1208 is then moved to the second position. This causes the lever locking protrusion 1211 to engage the lever locking notch 121, locking the clamp locking lever 1208 in the first position. This also causes the clamp locking mechanism 1212 to be inserted into the clamping trench 1205, via the clamp locking aperture 1214. As the clamp locking mechanism 1212 is inserted into the clamping trench 1205, the clamp locking mechanism 1212 engages clamp locking engaging surface 1402, locking the clamping adapter 1400 to the second attachment member 1201. Thus, the clamping adapter 1400 has been removably clamped to the second attachment member 1201.

After the clamping adapter 1400 has been removably clamped to the second attachment member 1201, the secondary computing device display 1100 is frictionally rotatable along the first axis and the second axis (with respect to the primary computing device display) by rotating the first or second rotatable shafts 1203 and 1204 and the primary computing device display is frictionally rotatable along the first axis and the second axis (with respect to the at least one secondary computing device display 1100) by rotating the first or second rotatable shafts 1203 and 1204.

Subsequently, The clamp locking lever 1208 of the second attachment member 1201 is moved to the second position, disengaging the lever locking protrusion 1211 from the lever locking notch 1213 and removing the clamp locking mechanism 1212 from the clamping trench 1205 via the clamp locking aperture 1214. As the clamp locking mechanism 1212 is positioned outside the clamping trench 1205, the clamp locking engaging surface 1402 is not engaged by the clamp locking mechanism 1212 engages, unlocking the clamping adapter 1400 from the second attachment member 1201. Thus, the clamp locking ridge 1401 is slideable within the clamping trench 1205 perpendicular with respect to the second attachment member 1201.

The clamp locking ridge 1401 is then slid in the clamping trench 1205 until the clamping ridge 1401 is positioned outside the clamping trench 1205 and the clamping post 1402 is positioned outside the aperture defined by the clamping lips 1206 and 1207. Thus, the second attachment member 1201 is no longer coupled to the clamping adapter 1400 and the secondary computing device display 1101 is no longer removably clamped to the primary computing device display.

The present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A secondary computing device display system, comprising:
   a primary computing device display;
   at least one removable attachment mechanism, comprising:
   a first attachment member; and a second attachment member, frictionally rotatably coupled to the first attachment member;

wherein the second attachment member is frictionally rotatable on a first axis and a second axis; and at least one secondary computing device display, operable to be removably attached to the primary computing device display utilizing the removable attachment mechanism;

wherein the first attachment member is operable to slideably attach to the at least one secondary computing device display, the second attachment member is operable to removably clamp to a portion of the primary computing device display within the second attachment member; and the second attachment member comprises a clamping trench with an aperture and the portion of the primary computing device display comprises a clamping ridge at least partially inserted within the aperture of the clamping trench.

2. The secondary computing device display system of claim 1, wherein the clamping trench includes a first and second lip that define the aperture that is narrower than the clamping trench, the clamping ridge includes a clamping post that is narrower than the clamping ridge, and when the clamping ridge is at least partially inserted within the clamping trench the clamping post is at least partially inserted in the aperture defined by the first and second lip.

3. The secondary computing device display system of claim 1, wherein the second attachment member further comprises a clamp locking lever operable between a first position and a second position wherein the clamp locking lever is operable to lock the second attachment member to the clamping ridge when the clamp locking lever is in the first position.

4. The secondary computing device display system of claim 3, wherein the clamping ridge is frictionally slideable within the clamping trench when the clamp locking lever is in the second position.

5. The secondary computing device display system of claim 3, wherein the clamping ridge comprises a clamp engaging surface including a plurality of notches.

6. The secondary computing device display system of claim 5, wherein the clamp locking lever further comprises a clamp locking mechanism that is positioned at least partially within the clamping trench when the clamp locking lever is in the first position.

7. The secondary computing device display system of claim 6, wherein the clamp locking mechanism is operable to engage the clamp engaging surface to lock the second attachment member to the clamping ridge when the clamp locking lever is in the first position.

8. The secondary computing device display system of claim 1, wherein the second attachment member further includes a lever locking mechanism operable to lock the clamp locking lever in place when the clamp locking lever is in the first position.

9. The secondary computing device display system of claim 8, wherein the portion of the primary computing device display comprises at least one adapter mounted to the primary computing device display.

10. The secondary computing device display system of claim 9, wherein the at least one adapter is adhesively mounted to the primary computing device display.

11. The secondary computing device display system of claim 1, wherein the first attachment member includes a first frictionally rotatably mounted shaft, the second attachment member includes a second frictionally rotatably mounted shaft, the first frictionally rotatably mounted shaft is coupled to the second frictionally rotatably mounted shaft, and the second attachment member is operable to frictionally rotate on the first access when the first frictionally rotatably mounted shaft rotates and the second axis when the second frictionally rotatably mounted shaft rotates.

12. The secondary computing device display system of claim 11, wherein the first frictionally rotatably mounted shaft is mounted with at least one first washer and at least one first belleville spring and the second frictionally rotatably mounted shaft is mounted with at least one second washer and at least one second belleville spring.

13. A removable attachment mechanism for removably attaching a primary computing device display to at least one secondary computing device display, comprising:

a first attachment member, operable to lockably attach to the at least one secondary computing device display; and a second attachment member, frictionally rotatably coupled to the first attachment member, the second attachment member being frictionally rotatable on a first axis and a second axis, comprising:

a clamping trench, including a first and second lip defining an aperture that is narrower than the clamping trench, operable to receive a clamping ridge coupled to the primary computing device display such that the clamping ridge is at least partially contained within the clamping trench and a clamping post coupled to the clamping ridge is at least partially contained within the aperture defined by the first and second lip;

a clamp locking lever operable between a lock position and an unlock position, the clamp locking lever including a clamp locking mechanism;

wherein the clamp locking mechanism is operable to lock the second attachment member to the clamping ridge partially contained within the clamping trench when the clamp locking lever is in the lock position.

14. The removable attachment mechanism of claim 13, wherein the clamping trench further includes a clamping mechanism aperture and the clamp locking mechanism is at least partially inserted into the clamping trench via the clamping mechanism aperture when the clamp locking lever is moved to the lock position.

15. The removable attachment mechanism of claim 14, wherein the clamp locking mechanism is at least partially removed from the clamping trench via the clamping mechanism aperture when the clamp locking lever is moved to the unlock position.

16. The removable attachment mechanism of claim 13, wherein the clamp locking mechanism is adapted to engage a notched surface of the clamping ridge partially contained within the clamping trench when the clamp locking lever is in the lock position.

17. The removable attachment mechanism of claim 13, wherein the first attachment member includes a first frictionally rotatably mounted shaft mounted with at least one first washer and at least one first belleville spring, the second attachment member includes a second frictionally rotatably mounted shaft mounted with at least one second washer and at least one second belleville spring, the first frictionally rotatably mounted shaft is coupled to the second frictionally rotatably mounted shaft, and the second attachment member is operable to frictionally rotate on the first access when the first frictionally rotatably mounted shaft rotates and the second axis when the second frictionally rotatably mounted shaft rotates.

18. The removable attachment mechanism of claim 13, wherein the second attachment member further includes a lever locking mechanism operable to lock the clamp locking lever in place when the clamp locking lever is in the first position.

19. A secondary computing device display system, comprising:
- a primary computing device display, including an adapter, the adapter comprising:
  - a clamping ridge including a notched surface; and
  - a clamping post, the clamping post having a narrower width that the clamping ridge;
- at least one secondary computing device display;
- at least one removable attachment mechanism, comprising:
  - a first attachment member, including a first frictionally rotatably mounted shaft, operable to slideably attach to the at least one secondary computing device display; and
  - a second attachment member, comprising:
    - a clamping trench including a first lip and a second lip that define an aperture that is narrower than the clamping trench;
    - a clamp locking lever, operable between a lock position and an unlock position, including a clamp locking mechanism that is at least partially inserted into the clamping trench via a clamping aperture when the clamp locking lever is moved into the lock position and is at least partially removed from the clamping trench via the clamping aperture when the clamp locking lever is moved into the second position; and
    - a lever locking mechanism operable to lock the clamp locking lever when the clamp locking lever is in the lock position;
- wherein the second attachment member is operable to couple to the adapter by inserting the clamping ridge at least partially into the clamping trench and the clamping post at least partially into the aperture defined by the first lip and second lip when the clamp locking lever is in the unlock position, the clamping ridge is frictionally slideable within the clamping trench when the clamp locking lever is in the unlock position, and the clamp locking mechanism is operable to engage the notched surface of the clamping ridge and lock the second attachment member to the adapter when the clamp locking lever is in the lock position; and
- wherein the second attachment member is frictionally rotatable on a first axis when the first frictionally mounted shaft rotates and a second axis when the second frictionally mounted shaft rotates.

* * * * *